US009385357B2

(12) United States Patent
Searles

(10) Patent No.: US 9,385,357 B2
(45) Date of Patent: Jul. 5, 2016

(54) BATTERY ASSEMBLY FOR FITTING A BATTERY PACK TO A FRAME OF A CYCLE

(71) Applicant: Modern Times Ltd., Hampshire (GB)

(72) Inventor: Mark Aubrey Searles, Hampshire (GB)

(73) Assignee: Modern Times Ltd., Hampshire (GB)

( * ) Notice: Subject to any disclaimer, the term of this patent is extended or adjusted under 35 U.S.C. 154(b) by 0 days.

(21) Appl. No.: 14/824,266

(22) Filed: Aug. 12, 2015

(65) Prior Publication Data

US 2016/0056432 A1 Feb. 25, 2016

(30) Foreign Application Priority Data

Aug. 21, 2014 (EP) .................................... 14181821

(51) Int. Cl.
*H01M 2/10* (2006.01)
*B62M 6/90* (2010.01)
*H01M 10/42* (2006.01)
*B60L 11/18* (2006.01)
*G05B 15/02* (2006.01)
*H01M 10/48* (2006.01)

(52) U.S. Cl.
CPC ......... *H01M 2/1083* (2013.01); *B60L 11/1859* (2013.01); *B60L 11/1861* (2013.01); *B62M 6/90* (2013.01); *G05B 15/02* (2013.01); *H01M 10/4257* (2013.01); *H01M 10/48* (2013.01); *B62K 2208/00* (2013.01); *H01M 2010/4271* (2013.01); *H01M 2220/20* (2013.01)

(58) Field of Classification Search
CPC ............ B62K 2208/00; B60L 11/1859; B60L 11/1861; G05B 15/02; H01M 2220/20; H01M 2/1083; H01M 10/4257; H01M 2010/4271; H01M 10/48; B62M 6/90
See application file for complete search history.

(56) References Cited

U.S. PATENT DOCUMENTS

| 6,095,270 | A | * | 8/2000 | Ishikawa | B62H 5/00 180/220 |
| 6,423,443 | B1 | * | 7/2002 | Tsuboi | B60K 1/04 180/68.5 |
| 2012/0145852 | A1 | | 6/2012 | Chiang | |

FOREIGN PATENT DOCUMENTS

| EP | 2 112 060 A2 | 10/2009 |
| EP | 2 541 640 A1 | 1/2013 |
| JP | H08 207877 A | 8/1996 |
| WO | 2013/044242 A2 | 3/2013 |

OTHER PUBLICATIONS

Extended European Search Report for corresponding Application No. 14181821.1 dated Mar. 6, 2015.

* cited by examiner

*Primary Examiner* — Yuen Wong
(74) *Attorney, Agent, or Firm* — Renner, Otto, Boisselle & Sklar, LLP

(57) ABSTRACT

A battery assembly 51 for fitting a battery pack 52 to a frame of a cycle 2 comprises a battery holder 54 for fitting to the frame, and a connector portion 55 which forms an electrical connection between the battery pack 52 and wiring 90 for connecting to at least one other component of the cycle when the battery pack is held by the holder 54. The connector portion 55 is slideable in a linear direction with respect to the battery holder between an open position which provides clearance of the battery pack to be inserted into the holder and a closed position in which the connection is formed. A clamping mechanism is provided to clamp the battery pack into the battery holder when the connector portion is closed.

13 Claims, 26 Drawing Sheets

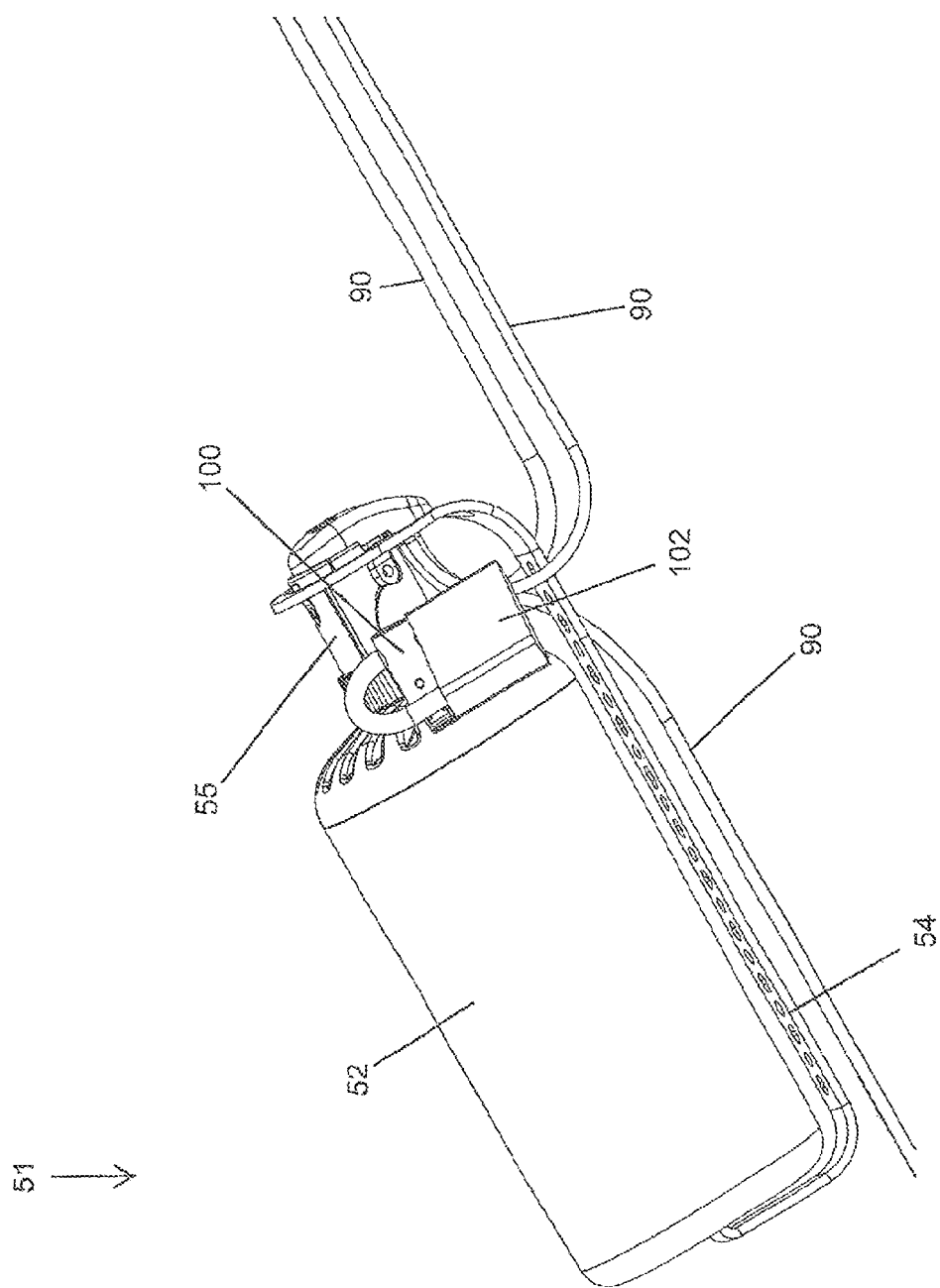

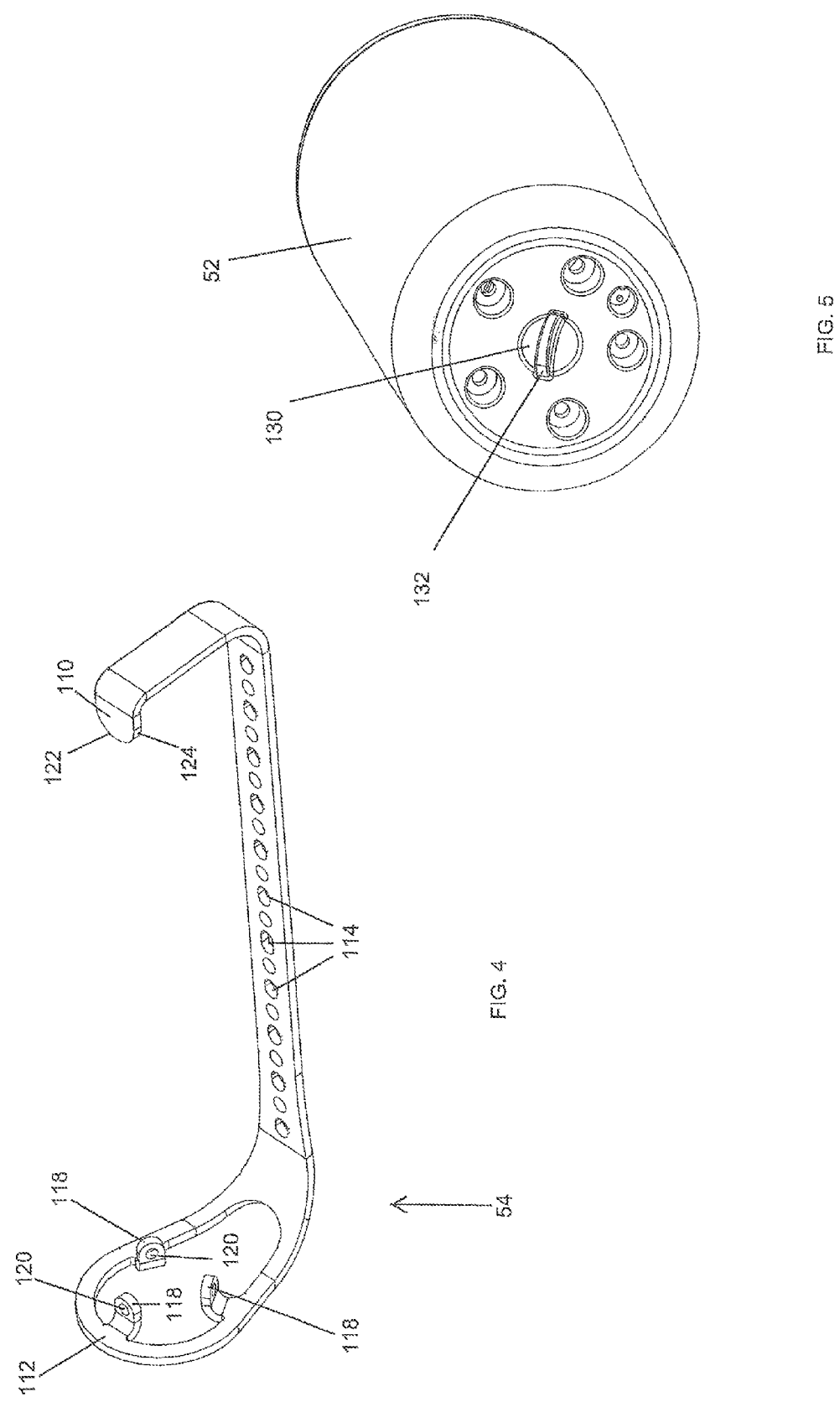

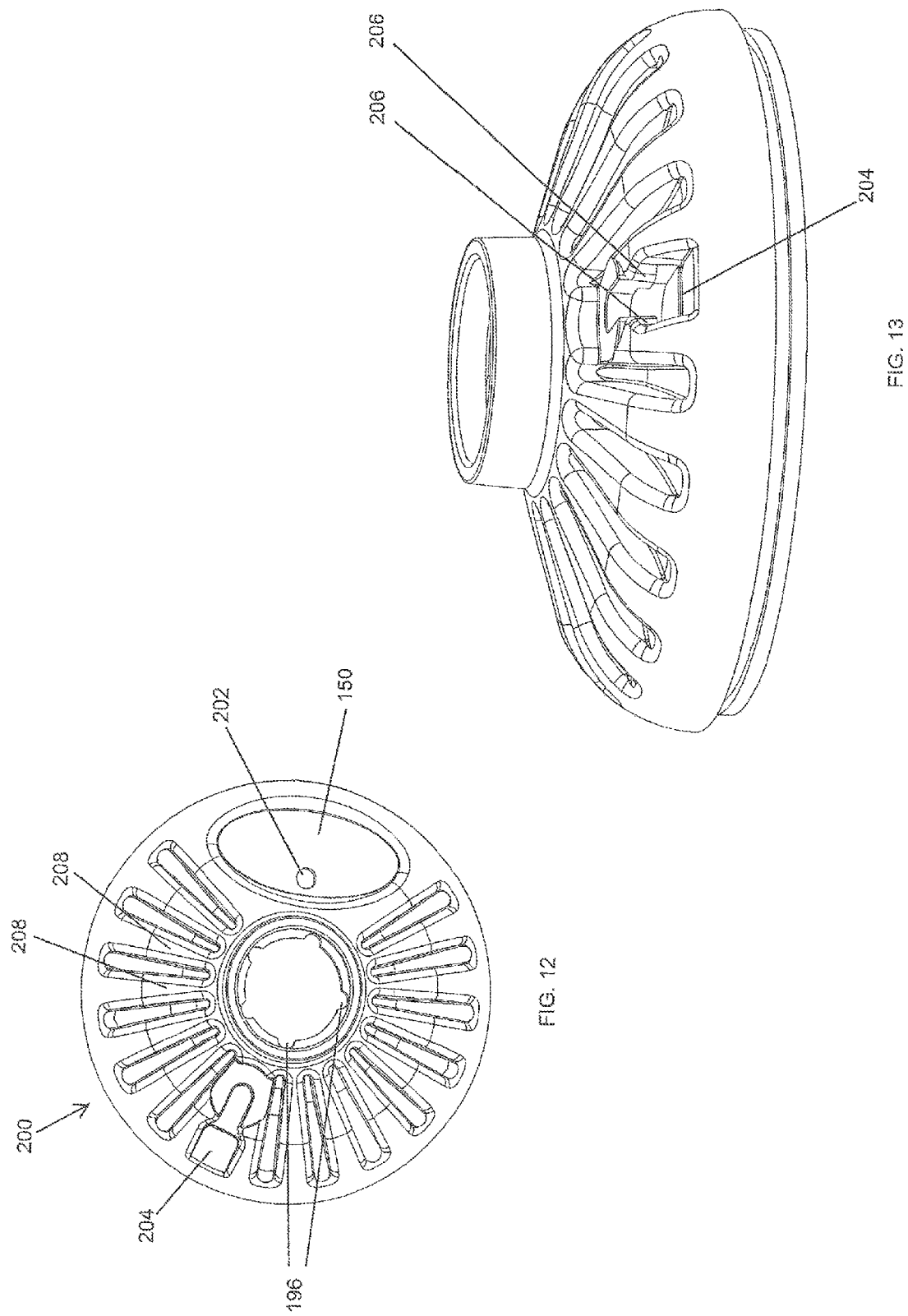

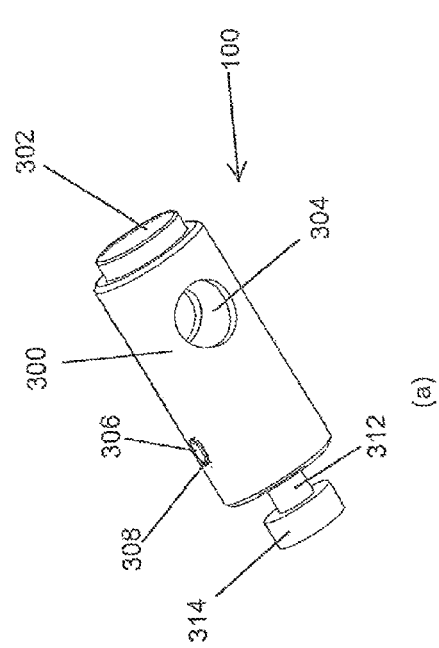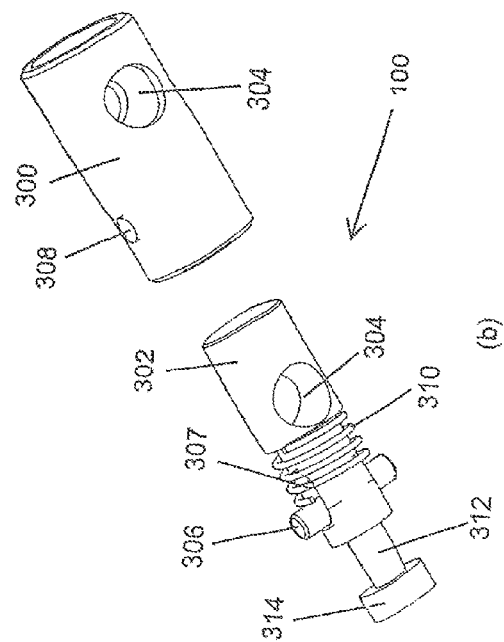
FIG. 19
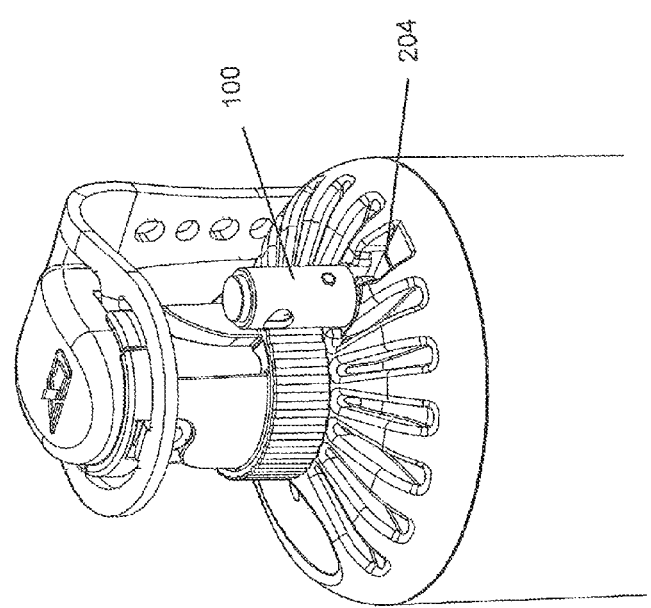
FIG. 18

BATTERY ASSEMBLY FOR FITTING A BATTERY PACK TO A FRAME OF A CYCLE

This application claims priority of European Application No. 14181821.1 filed Aug. 21, 2014, which is hereby incorporated herein by reference.

The present technique relates to the field of cycles. More particularly, it relates to a battery assembly for fitting a battery pack to a frame of a cycle.

A cycle, such as a pedal cycle or motorcycle, may have a battery pack comprising a battery for powering at least one component of the cycle. For example, the battery may be for powering an electric motor in an electric cycle, or for powering lights or electronic equipment such as a cycle computer. The present technique seeks to provide an improved battery assembly for fitting a battery pack to a frame of a cycle.

Viewed from one aspect, the present technique provides a battery assembly for fitting a battery pack to a frame of a cycle, the battery assembly comprising:

a battery holder for fitting to the frame, wherein the battery holder is configured to hold the battery pack;

a connector portion configured to form an electrical connection between wiring for connecting to at least one component of the cycle and the battery pack when the battery pack is held by the battery holder, wherein the connector portion is slidable within part of the battery holder in a linear direction with respect to the battery holder between an open position providing clearance for the battery pack to be inserted into or removed from the battery holder, and a closed position in which the connector portion engages with a mating portion of the battery pack to form the electrical connection with the battery pack; and a clamping mechanism configured to clamp the battery pack into the battery holder when the connector portion is in the closed position.

The inventor of the present technique recognised that there is a significant design challenge in providing a battery assembly suitable for fitting a battery pack to a frame of a cycle. Firstly, the space available within the frame for accommodating the battery assembly is typically limited, especially if the battery assembly is to be compatible with a wide range of different frame sizes or shapes. Also, the electrical connection formed between the battery pack and other components of the cycle can make fitting the battery pack more complex, and may limit how compact the battery assembly can be made. Also, it may be desirable that the battery pack is held securely so that it does not rattle, move or fall off the frame while the cycle is in motion. Existing battery assemblies are either ineffective at holding the battery when the cycle is in motion resulting in annoying rattling or the battery pack falling out when the cycle is moving over rough terrain, take up a large amount of space and so are not compatible with relatively small frames or are limited in the number of electrical connections they can make.

The battery assembly of the present technique addresses these problems by providing a sliding connecting portion and a clamping mechanism. The clamping mechanism clamps the battery pack into the battery holder when the connector portion is closed, to prevent the battery pack falling out. The connector portion is slidable within part of the battery holder in a linear direction with respect to the battery holder between an open position providing clearance for the battery pack to be inserted to or removed from the battery holder and a closed position in which the connector portion engages with a mating portion of the battery pack to form an electrical connection between the battery and wiring for connecting to another component of the cycle. Forming the electrical connection with a linear motion can be important because some connector designs are not capable of forming a connection by rotating connector pins into place or inserting a connector pin into a socket at an angle (e.g. when a larger number of connections is required). However, forming a connection by a linear motion then restricts the way in which the connector and battery assembly can be designed. In typical designs which use a linear motion to form a connection, the battery pack is slid down onto a static connector, but it is recognised that this is inappropriate for battery packs which fit to a frame of a cycle because sliding the battery pack down linearly requires additional space to be provided above the battery holder. This can make the battery assembly inappropriate for cycles with small frames. This issue is addressed by providing a connector portion which slides relative to the battery holder so that once the battery is within the holder, the connector portion can be slid down linearly to form the connection. Hence, the combination of the connector portion and the clamping mechanism provides a battery assembly which can securely retain the battery while the cycle is moving and which does not need a large amount of spare space above the battery holder.

In one example, the battery holder may have an engaging portion for engaging with a corresponding portion of the battery pack when the battery pack is inserted in the battery holder in an angled position which is angled relative to an in-use position of the battery pack. The engaging portion may permit the battery pack to be tilted from the angled position into the in-use position while the corresponding portion of the battery pack is engaged with the engaging portion of the battery holder. This arrangement is useful because it permits the battery assembly to be fitted to cycles with smaller frames. By tilting the battery pack into the holder, it is not necessary to provide spare space above the battery holder to allow the battery pack to be slid into position. Instead, the battery pack can be tilted in from the side, which is more efficient in terms of space. The engaging portion of the holder engages with a corresponding portion of the battery pack to ensure that the battery is aligned appropriately with the holder. Having inserted the battery pack, the connector portion can be slid down linearly to form the electrical connection with the battery pack already in position.

The engaging portion of the battery holder may have different designs. In one example the engaging portion comprises a protruding portion of the battery holder which engages with an indented portion of the battery pack. Hence, when inserting the battery the user can insert the battery pack into the holder so that the indented portion of the battery pack receives the protruding portion of the battery holder, and then tilt the battery into position. In one example, the protruding portion may have a curved end surface which slides against a curved indent surface of the indented portion of the battery pack. This allows the battery pack to be easily tilted between the angled position and the in-use position, and helps the user to correctly align the battery pack with the holder.

In one example, the connector portion may form a single connection between the battery pack and wiring leading to another component of the cycle. However, the battery assembly is particularly useful when the connector portion forms multiple connections between the battery pack and wiring, for example if multiple components are to be powered by the battery. When there are multiple connections to be made (e.g. using multiple pins which are to be inserted into multiple sockets), then it is difficult to form a connection using a non-linear motion, and so the linearly sliding connector portion is useful. The present technique provides a more compact mechanism for forming the electrical connection with a linear motion.

In some examples, the battery assembly may have a clamping mechanism which is separate from the connector portion. However, it can be more convenient for the user if at least part of the clamping mechanism is included in the connector portion, so that sliding the connector portion down to form the electrical connection also clamps the battery pack into the holder. In some cases, the user may not only complete the electrical connection, but also clamp the battery pack into the battery holder, by performing a single user operation, such as sliding or twisting the connector portion. This avoids the need for the user to perform two separate operations for connecting the wiring to the battery pack and clamping the battery pack. For example, the connector portion may have a rotating part which is rotatable with respect to the battery holder, and the single user operation may comprise the user rotating the rotating part with respect to the battery holder to slide the rotating part towards the battery pack along the linear direction to clamp the battery pack into the holder. Note that, although the electrical connection is completed and the battery pack clamped in response to a single user operation in the example discussed above, this does not rule out that in some embodiments there may be another operation which the user performs before the single user operation. For example, having inserted the battery pack into the holder, the user may first slide the connector portion down over the mating portion of the battery pack and then rotate the rotating part to clamp the battery pack and complete the electrical connection.

In one example, the clamping mechanism comprises at least one cam portion provided on one of the rotating part of the connector portion and the battery holder and at least one engaging portion provided on the other of the rotating part and the battery holder. Rotation of the rotating part relative to the battery holder may cause the at least one engaging portion to slide with respect to the at least one cam portion to force the rotating part towards the battery pack to clamp the battery pack into the holder. In this way, a clamping mechanism with relatively few components can be provided (so that it is cheaper to manufacture than more complicated clamping systems), but which nevertheless provides secure and effective clamping of the battery pack into the holder in response to a relatively straightforward operation by the user.

Some embodiments may provide the cam portions on the battery holder and the engaging portions on the rotating part of the connector portion. However, it has been found that it is particularly effective if the battery holder comprises the at least one engaging portion and the rotating part comprises at least one cam portion.

While it is possible to provide a clamping mechanism with a single cam portion and single engaging portion, an improved clamping action can be achieved by providing multiple cam portions and multiple engaging portions with each of the engaging portions engaging with a respective one of the cam portions. In particular if there at least three cam portions and at least three engaging portions then this may provide a stable clamping action which retains the orientation of the connector portion as it clamps the battery pack, so that the electric connection can be formed correctly.

In other examples, two engaging portions could be used either side of the cycle when the battery holder is installed on the cycle in order to ensure the connector closes flush to the top of the battery pack. However, using three or more engaging portions may provide greater security for ensuring that the battery pack does not come out, and also provides greater security if the cage becomes loose.

To ensure that the connector portion moves in a linear direction, it is useful to provide the connector portion with a guide portion with the rotating part rotatable relative to the guide portion about an axis of rotation. The guide portion may have at least one groove which is aligned in an axial direction parallel to the axis of rotation. When the rotating part is rotated, the at least one engaging portion may then slide with respect to the at least one cam portion in the rotational direction as well as sliding along the at least one groove in the axial direction to cause part of the connector portion (e.g. the rotating part) to move towards the battery pack in the axial direction to clamp the battery pack into the battery holder. Hence, the at least one groove helps to limit the movement of the connector portion relative to the battery holder to ensure that the connector portion retains its orientation and does not twist. This ensures a linear motion along the axial direction so that the electrical connection is properly formed. In particular, it has been found that when three grooves, three cam portions and three engaging portions are provided then this provided a secure connection and clamping mechanism, which is much more compact than existing arrangements.

In some examples, the rotating part itself may move towards the battery pack in the axial direction to clamp the battery pack into the battery holder. In other examples, a connector part which moves towards the battery pack may be separate from the rotating part, so that as the rotating part rotates relative to the holder, the rotating part does not move in a linear direction, but causes the connector part to slide in towards the battery (e.g. with a similar mechanism to a lipstick).

At least one ball may be disposed between the at least one engaging portion and the at least one groove. This reduces friction between the connector portion and the battery holder to ensure a smooth motion of the connector in addition to keeping the axis of the connector central between the cam portions, facilitating easy manufacture of the battery holder and improving assembly of the battery holder and connector portion. For example, the ball(s) may be made of a metal or alloy, such as steel or stainless steel, or a thermoplastic or polymer such as nylon or polytetrafluoroethylene (also known as PTFE or Teflon®). It has been found that in practice making the balls from a thermoplastic such as PTFE or nylon helps to ensure there is no audible rattling when the battery pack is clamped in the battery holder, such as if the battery assembly is made with poorer manufacturing tolerances, but metal or alloy balls can also be used.

The connector portion may have a wiring guide portion which guides the wiring from the connector portion to the frame of the cycle and/or clamps the wiring in position. To prevent damage to the wires, preferably the wiring guide portion may be arranged so that the wiring arcs away from the battery assembly onto the frame so that it does not bend acutely or kink. This can be done by setting the angle at which the wire escapes from the wiring guide at a suitable angle. In some examples the wiring guide may be a plastic portion which snaps on to the rest of the connector and can be adjusted laterally relative to the connector to move the wiring to different positions. In another example the wiring guide may be a plastic portion which snaps into a groove around the connector portion and secures to the connector portion whilst clamping the wires at the same time with a screw and nut that fit through an aperture in the wiring guide that runs at a right angle to the axis of the connector.

A secondary cable guide may also be provided which routes the cable for convenience on either side of a tube or portion of the frame of the cycle. The secondary cable guide holds the wires against the cycle frame and maintains the desirable arc in the wiring as the connector portion moves to prevent damage to the wiring and may be made from a flexible plastic which can flex to accommodate different bicycle frame widths in this position on the bicycle. This secondary cable guide may also run under the battery holder in order to prevent this end of the battery holder rattling against the frame of the bicycle when the bicycle is in use and the battery pack is clamped in the battery holder.

The battery assembly as discussed above is very useful for retrofitting to a range of differently sized and shaped frames of cycles. A certain length of wiring may be provided with the battery assembly, and it may be undesirable to have to cut the wire to a different length to suit the particular frame to which the battery assembly is fitted. To avoid this problem, the battery holder may have a plurality of sets of fixing holes for receiving fixing means (e.g. a screw or bolt) for fixing the battery holder to the frame of the cycle with each set of fixing holes being for fixing the battery holder in a different position relative to the frame. Hence, even if the frame has a single location at which it can receive fixing means for fixing the battery holder (e.g. holes for attaching a water bottle), the position of the battery holder relative to the frame can be adjusted by selecting a different set of fixing holes of the battery holder. This means that the battery holder can be moved up and down relative to the frame in order to take up slack, or reduce tension, in the wiring. Providing multiple fixing holes in the battery holder also provides flexibility in case the fixings on the frame are close to another part of the frame, since then a different set of fixing holes may still be able to accommodate the entire battery assembly within the space available.

The connector portion and clamping mechanism of the present technique makes it very easy for the user to insert or remove the battery and connect up wiring. However, this also makes it easier for a malicious party to remove the battery pack and steal the battery, which may be relatively expensive. Therefore, the battery assembly may comprise a locking member which locks the battery pack to prevent removal of the battery pack.

At the most basic level, the locking member may simply lock the battery pack to the locking member itself, without securing it to any other part of the battery assembly such as the battery holder or the connector portion. The locking member for example may have a hole for receiving a lock, padlock or chain which could then be locked to another object such as a railing, fence or a bicycle lock to secure the battery pack. In other examples, the locking member may also secure the battery pack to a part of the battery assembly, such as the battery holder or the connector portion.

In one example, the locking member may have first and second portions which are movable relative to each other. The first and second portions may each have a hole for receiving a lock (which may be a chain, padlock, or any other locking device) when the holes of the first and second portions are aligned with each other. The locking member may then be arranged so that the battery pack is only removable from the locking member when the holes in the first and second portions are not aligned with each other. Therefore, when the lock is passed through the holes of the first and second portions, this will prevent the first and second portions being moved relative to each other and so the locking member cannot be moved into the position in which it can be disconnected from the battery pack. This provides a secure attachment to the battery pack using a simple locking mechanism which has relatively few components and so can be relatively cheap to manufacture.

For example, the second portion may have a protruding portion which engages with a locking recess of the battery pack to prevent the battery pack being removed from the locking member. The protruding portion of the locking member may have a head which is shaped to prevent it being removed from the locking recess of the battery pack while the holes in the first and second portions are aligned with each other. For example, the head of the protruding portion may have a shape which cannot be slid out of the locking recess unless it is pushed further down to avoid a barrier part of the locking recess. However, pushing down the protruding portion may only be possible when the holes of the first and second portions are no longer in alignment, and this is only possible when there is no lock passing through the holes. Therefore, the lock prevents the locking member being decoupled from the battery pack. In one example, a spring may be provided for biasing the second portion relative to the first portion in an opposite direction to a direction of movement of the second portion which is required for removing the protruding portion from the locking recess. The spring ensures that generally the locking member will retain the battery pack in the locked state until the user removes the lock and pushes the second portion to move the protruding portion downwards.

Optionally, the locking member may also engage with a portion of the connector portion or cam portion. For example, the locking member may have an engaging portion which engages with a corresponding portion of the cam portion to prevent the cam portion from being rotated and allowing the connector portion to slide from the closed position to the open position. For example, the connector portion may have a recess which receives the locking member so that when the locking member is inserted, the connector portion cannot be moved away from the closed position to disconnect the connector portion from the battery pack. Hence, this further secures the battery.

It is possible to provide the battery assembly comprising the battery holder and connector portion only, without providing the battery pack itself. For example, someone may wish to provide multiple battery assemblies with a single battery pack, so that the same battery pack can be shared between two or more cycles each having a separate battery assembly. However, in many cases a battery assembly will be provided together with the battery pack. The cyclist may also want two batteries to extend their range. Therefore, one battery holder may be provided with wiring on one part of the cycle (e.g. the down tube) and another battery holder provided without wiring on another part (e.g. the seat tube) to hold the battery that is not in use. In another example two battery holders may be provided in such a way that they connect together electronically so that two battery packs may be used to extend range automatically by switching from one battery to the other when the first to be used reaches a certain low charge level indicator. Also two battery assemblies may be used to power two separate motors.

The battery pack may have an indented portion for receiving a protruding portion of the battery holder as discussed above. The indented portion may have a curved indent surface for sliding against a curved end surface of the protruding portion of the battery holder. This is useful because it allows the battery pack to be rotated into position while the indented portion is sliding against the protruding portion of the battery holder. By tilting the battery into position rather than sliding it in linearly, less space is required for inserting the battery allowing it to be used with smaller frames. In some examples the indented portion may comprise a substantially hemispherical indent which allows tilting the battery in place from a range of different directions. A hemispherical indent is advantageous because it allows the user to easily locate the unseen recess in the casing of the battery pack, and guide the protruding portion of the battery holder into the centre of the indent to make it easy to fit the battery pack into the holder. For the same reason the portion of the battery surrounding the hemispherical indent may also be tapered towards this indent.

The indented portion of the battery pack may also comprise a slot portion which receives the protruding portion of the battery holder to align the battery pack relative to the protruding portion. By including a slot in the battery casing and forming the protruding portion of the battery holder with a relatively flat shape which will engage with a slot, the battery pack can only be inserted in certain orientations, to prevent incorrect insertion which could damage the connector when the connector portion is slid onto the battery pack. The slot may receive the protruding portion of the battery holder in one of two possible orientations, so if only one of these orientations is the correct one, then the battery pack may also include a further indication (e.g. a sticker or mark on the battery pack which should be located on a particular side of the battery holder when in the correct orientation) which helps the user identify which is the correct orientation.

In some cases the slot may be the only indent in the battery pack, and in other cases only a hemispherical indent may be provided without a slot (it is not essential to provide both). However, preferably both of these features are provided, with a substantially hemispherical indent surface of the battery pack including a slot portion within it. In this case, the slot portion may itself have a curved surface inside the slot to allow tilting of the battery relative to the battery holder while the protruding portion is in the slot. Similarly, the protruding portion of the battery holder may have a corresponding curved end surface which will rotate about the slot. The hemispherical indent allows easy location of the protrusion in the centre of the base of battery, and then the user can twist the battery pack to locate the protrusion in the slot in the battery pack—the user can feel the protruding portion drop into the slot, and then tilt the battery pack into position. To allow easy location of the unseen indent the area surrounding the indent may be conical in shape, tapering towards the indent.

A control unit may be provided within a casing of the battery pack for controlling at least one component of the cycle. For example, with an electronic cycle or kit for fitting to a cycle to convert it into an electric cycle, a control unit (e.g. a printed circuit board or microcontroller) may be provided for controlling and driving an electric motor or a sensor for sensing pedaling speed. Providing the control unit within the battery casing reduces the number of components that are to be fitted to the cycle, resulting in a neater system.

The battery pack may have a heat sink portion for dissipating heat from the control unit and battery. For example, the heat sink portion may have a number of heat radiating fins for radiating heat. In one example, the heat sink portion may comprise part of the casing of the battery pack that is made of metal. For example, with a bottle shaped or cylindrical battery pack the end of the battery may be die cast from alloy. Also, the battery pack may have at least one metal bolt which passes through at least part of the battery pack for holding it together. If so, then the bolt may be coupled to the heating portion so that the heat generated by the battery pack and/or printed circuit board is conducted along the bolt to the heat sink portion to dissipate to the outside. Hence, by providing metal bolts coupled to the heat sink portion, more effective heat dissipation is provided.

To save power, the control unit may have a power saving mode for reducing the charge drawn from the battery. For example, the control unit may be isolated from the battery during the power saving mode (e.g. using power gating), or circuitry may be provided to allow a very low power state. For example, the control unit may switch to the power saving mode if the component it is controlling is not currently active.

It can be useful to provide a way for the user to check how much charge is left in the battery. For example, the control unit may detect the amount of remaining charge and may generate an indication of the amount of charge remaining. For example, the control unit may display a numeric indication of the amount of charge or a percentage charge remaining, or may simply give a qualitative indication of whether the remaining charge is low (e.g. illuminating different coloured LEDs to indicate different charge levels). The amount of remaining charge can be detected for example from the voltage generated by the battery or by coulomb counting However, to conserve battery charge it may not be desirable for the control unit to continually display the amount of remaining charge (particularly if the control unit is in the power saving mode). Therefore, it can be useful to provide a way for the user to trigger the control unit to check the amount of remaining charge in the battery and display an indication of this. It may be possible to provide a button or user interface for instructing the control unit to check the charge remaining. However, external switches and interfaces increase manufacturing costs for example due to the need to seal them. Therefore, a low cost technique is for the control unit to check whether a predetermined motion of the battery pack is detected, and in response to detecting the predetermined motion the control unit may provide an indication of the amount of remaining charge. For example, the control unit may have an accelerometer or other motion detector, and may detect a signature pattern of motion (e.g. a predetermined sequence of motion) which is to trigger display of the amount of remaining charge detected. For example, the predetermined motion may correspond to the user shaking the battery pack backwards and forwards, so that the user has simply to shake the battery pack to cause the indication of the amount of charge remaining to be displayed.

In some systems, the component controlled by the control unit may be an electric motor, especially when the battery assembly is used for an electrically assisted cycle or provided within an electrically assisted cycle kit for retrofitting to cycles to convert them into electrically assisted cycles. In this case the control unit may for example drive the electric motor by a method such as controlling an amount of current supplied to the electric motor, by for example a field-oriented control method. In general, the larger the current supplied, the greater the assistance provided by the motor. In one example, the motor may provide assistance which supplements the pedaling of the cyclist, rather than being a replacement for pedaling.

However, to protect the battery there may be a certain minimum voltage at which the battery can operate without damage. This may cause a problem when the cyclist calls for electrical assistance from the motor (e.g. when ascending a hill). When the cyclist requests electrical assistance, a current is drawn from the battery, and this may cause an instantaneous voltage drop at the battery. When the battery is reasonably full of charge, this may not be a problem, but as the battery charge is used up, the voltage provided by the battery decreases, so eventually the voltage drop on drawing current from the battery causes the voltage to drop below the safety threshold, causing the electrical assistance to be halted. This is frustrating for the user, since it can occur when there is still a significant amount of charge in the battery because the large current required to climb a steep gradient for example results in a large voltage drop.

Without a solution to this problem, the user can no longer obtain assistance from the motor. However, the inventor recognised that at this point there is still useful charge remaining in the battery, because the voltage only dipped below the safety threshold due to the instantaneous voltage drop rather than being consistently below the threshold. This useful charge is not exploited in known systems.

To address this problem, the control unit may automatically reduce the amount of current that is supplied to the electric motor as the amount of charge remaining in the battery decreases. For example the control unit may establish a number of threshold operating points which each correspond to a different amount of charge remaining in the battery. Each time the battery passes one of the threshold operating points the control unit may reduce the maximum amount of current supplied to the electric motor in response to a given event. Since the voltage drop on activating the assistance is proportional to the current drawn, reducing the maximum amount of current that can be drawn also reduces the amount of voltage drop so that it is less likely that the battery voltage will drop below the safety threshold. The maximum current can then be tapered in a series of steps so that each time one of the thresholds is crossed, the current is reduced a little more so that assistance can continue even as the amount of charge is low. This improves the user experience since it is less likely that the assistance supplied from the motor will suddenly cut out unexpectedly, all of the useful charge can be used for assistance and the battery can be reliably reduced to a known low voltage level providing a reliable "battery empty" marker for the purpose of charge monitoring and also allowing full cycling of the battery which helps to optimise battery life.

There may be different ways for the control unit within the battery casing to monitor the amount of charge to check whether it has passed the threshold operating point. A simple way is to monitor the voltage provided by the battery and check whether it has dropped to a fixed threshold voltage (which is likely to be higher than the battery protection threshold voltage). As the battery charge reduces, the voltage will gradually drop and when it drops below the threshold voltage level, the maximum current is reduced, which will cause the voltage to increase again. Subsequently the voltage will again drop to the same threshold voltage as the charge continues to be used up, at which point then the maximum current may be reduced further. In this way, each time the voltage drops to a certain level then the current limit is reduced, so that the user cannot get more current than this without recharging the battery, and the battery voltage climbs up again until it hits the level again, and this may be repeated several times. This approach allows a number of tapering points to be controlled using a single voltage threshold. In some systems, after several instances of reducing the current based on one voltage threshold, another voltage threshold may then be used for two or more further instances of reducing the maximum current. In this way the maximum amount of charge can be extracted from the battery since even when the charge is relatively low, only small amounts of charge will be drawn to prevent the battery cutting out. Another way of monitoring the amount of charge is to directly detect the amount of charge and set a number of threshold operating points for each charge amount and monitor when the charge is passing below this operating point. However, it may often be more convenient to monitor the voltage which is provided by the battery rather than the amount of charge.

The battery pack may comprise a number of battery cells disposed within its casing and at least one cell holder which holds ends of at least some of the cells. To make more efficient use of space, it can be useful to provide the cell holder so that it has a number of protrusions at positions corresponding to gaps between the battery cells with each protrusion having at least one wing portion extending from the protrusion for gripping a part of a corresponding battery cell. This arrangement is more efficient in terms of space than existing designs which typically provide a circular holder with a number of circular holes for receiving ends of battery cells. This is because the known cell holder requires a bounding layer of plastic to be provided around each cell which significantly increases the size of the battery pack required for a given number of battery cells. The cell holder of the present technique has protrusions with wings which grip part of the battery cell, which requires less space around the cells since it allows adjacent cells to come closer together as there is no plastic layer extending all the way around each cell.

In some embodiments each battery cell may be gripped by three or more wings (typically on different protrusions), so that the cells can be supported and oriented in a parallel manner. Each battery cell may be gripped by wing portions at only part of the circumference of the battery cell. This allows the battery cells to be packed more closely together since it allows the sides of adjacent cells to contact each other (or at least be closer together), which is not possible with previous cell holder designs. The wing portions of different protrusions may not touch each other, so that there is a gap between adjacent wing portions. Also, the protrusions and wing portions do not extend outside the largest diameter of the battery pack formed by the cells themselves in a circular pack, so not only can the cells be positioned very close but cells run up to the edge of the pack which makes the pack as small as possible and is also advantageous for heat transfer.

The wing portions may flex so as to deform as the battery cells are placed in the holder, to grip the cells in position. The wings may not touch the base of the cell holder so that they can flex. In some examples, the cell holder may be moulded from plastic or another material using a moulding tool. To be able to form the wing portions using a moulding tool, the cell holder may have at least one hole provided below the wing portions to allow passage of a moulding tool. In this way the moulding tool may come up and mould the underside of the wing from below through the hole to prevent it from being joined to the base of the cell holder, thus making a simple inexpensive moulding tool.

The battery pack may have a wide range of shapes. However, it is particularly useful to make the battery pack bottle shaped or cylindrical and for the battery holder to comprise a cage for holding the battery pack. By disguising the battery as a water bottle, the cycle does not look like an assisted cycle, and also this makes the cycle neater. A cylindrical battery pack also provides a more aerodynamic shape than shapes with corners.

Viewed from another aspect, the present technique provides a cycle fitted with a battery assembly as discussed above. For example, the cycle may comprise a pedal cycle such as a bicycle, tricycle or tandem, or a motor cycle or quad bike for example. The battery assembly may be used for powering any component of the cycle, but is particularly useful when used for controlling a motor for an electric cycle and any sensors (e.g. a pedal sensor or gear tooth sensor) for sensing data for controlling the amount of motor assistance provided.

Viewed from another aspect, the present technique provides an electrically assisted cycle kit for retrofitting to a pedal cycle, with the kit comprising the battery assembly as discussed above. For example the kit may include a motor, a pedal speed sensor, a switch, display or other interface and the battery assembly, and can be retrofitted to an existing cycle to convert the cycle into an electric cycle. The kit may also include a charger for charging the battery. The present technique is particularly useful for a kit because the compact nature of the battery assembly makes it easy to retrofit to frames of a wide range of different cycles of different sizes and shapes and the connector portion makes it easy for the user to insert and remove the battery pack from the battery holder.

Viewed from another aspect, the present technique provides a method of fitting a battery assembly to a cycle, the method comprising:

fitting a battery holder to a frame of the cycle;

inserting the battery pack into the battery holder;

forming an electrical connection between wiring for connecting to at least one component of the cycle and the battery pack by sliding a connector portion within part of the battery holder in a linear direction with respect to the battery holder from an open position providing clearance for the battery pack to be inserted into or removed from the battery holder to a closed position in which the connector portion engages with a mating portion of the battery pack to form the electrical connection with the battery pack; and clamping the battery pack into the battery holder when the connector portion is in the closed position.

Viewed from a further aspect, the present technique provides a battery pack for a cycle, comprising:

a battery casing;

a plurality of battery cells disposed within the battery casing; and at least one cell holder for holding ends of at least some of the battery cells;

wherein the at least one cell holder comprises a plurality of protrusions at positions corresponding to gaps between the battery cells, each protrusion having at least one wing portion extending from the protrusion for gripping a part of a corresponding battery cell.

The battery pack as discussed above may be provided independently from the battery holder and rest of the battery assembly, for example being provided as a spare battery pack so that one battery pack can be in use on the cycle while another battery pack is being charged. A battery pack provided with a cell holder as discussed above is more compact than existing battery packs because it does not require a solid layer of plastic around each battery cell (a solid layer of plastic would increase the outside diameter of a battery pack and require additional spacing between cells) and instead allows the cells to be placed touching each other or close to each other with the battery cells gripped by wing portions extending from protrusions between each cell. As well as the cell holder, the battery pack may have the control unit as discussed above and may have an indented portion with a curved indent surface and/or slot within it as discussed above, for aligning the battery pack relative to a protruding part of the holder.

Viewed from another aspect, the present technique provides a locking member for locking to a battery pack for a cycle; the locking member comprising:

first and second portions movable relative to each other, wherein the first and second portions each comprise a hole for receiving a lock when the holes of the first and second portions are aligned with each other;

wherein the second portion comprises a protruding portion for engaging with a locking recess of the battery pack to prevent the battery pack being decoupled from the locking member; and the protruding portion is removable from the locking recess of the battery pack when the holes of the first and second portions are not aligned with each other.

The locking member as discussed above may also be provided independently from the rest of the battery assembly.

Further aspects, features and advantages of the present technique will be apparent from the following description of examples, which is to be read in conjunction with the accompanying drawings, in which:

FIG. 1 schematically illustrates an example of a cycle fitted with a battery assembly;

FIG. 3 illustrates an example of a battery assembly;

FIG. 4 illustrates an example of a battery holder for holding a battery pack;

FIG. 5 shows an example of the casing of a battery pack;

Figure 9B:
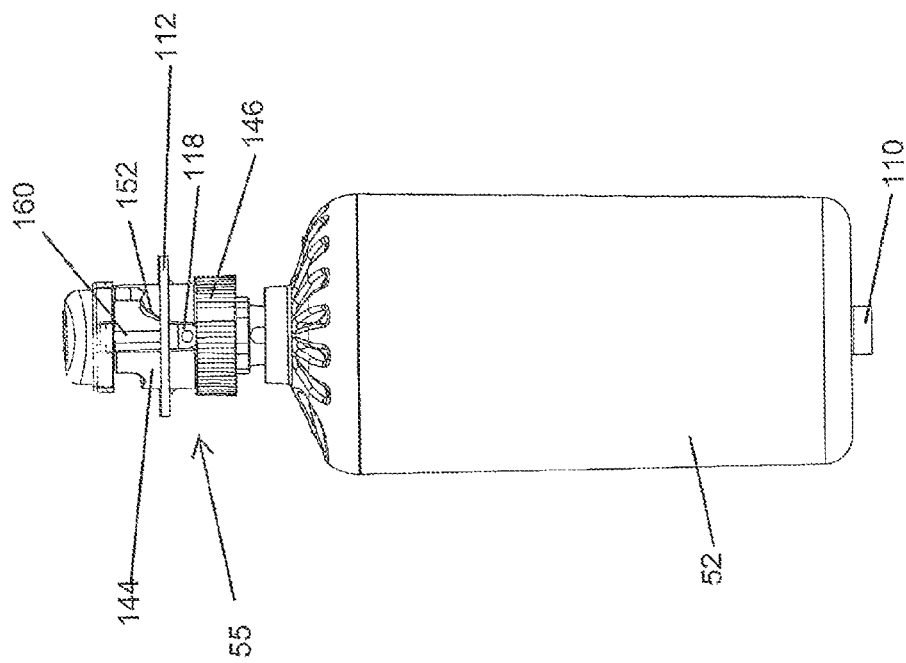
Figure 9A:
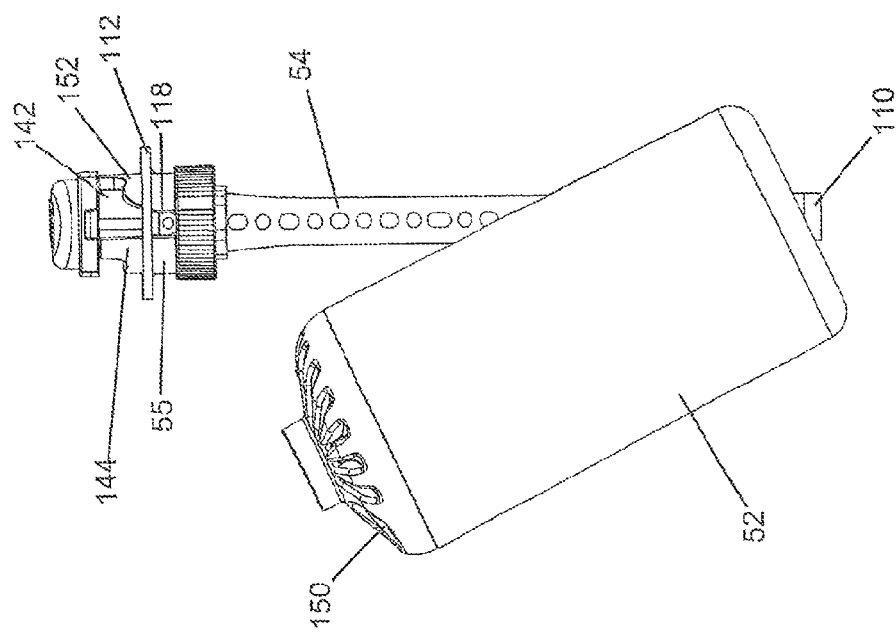
Figure 10:
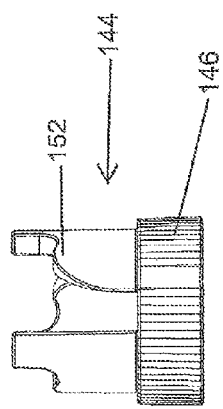
Figure 11:
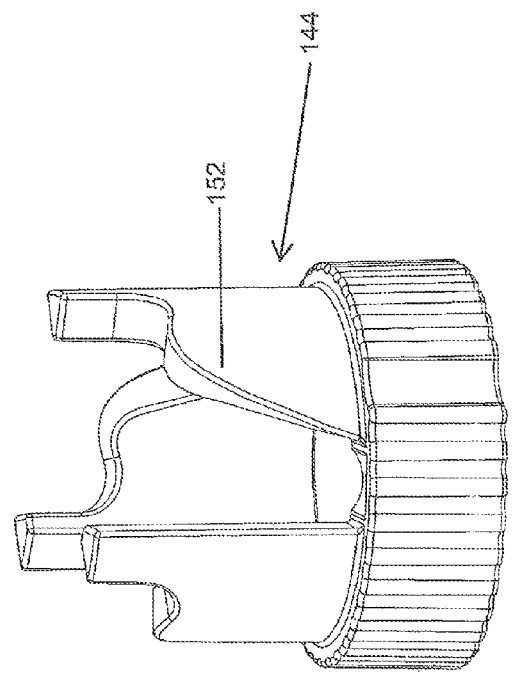
Figure 9C:
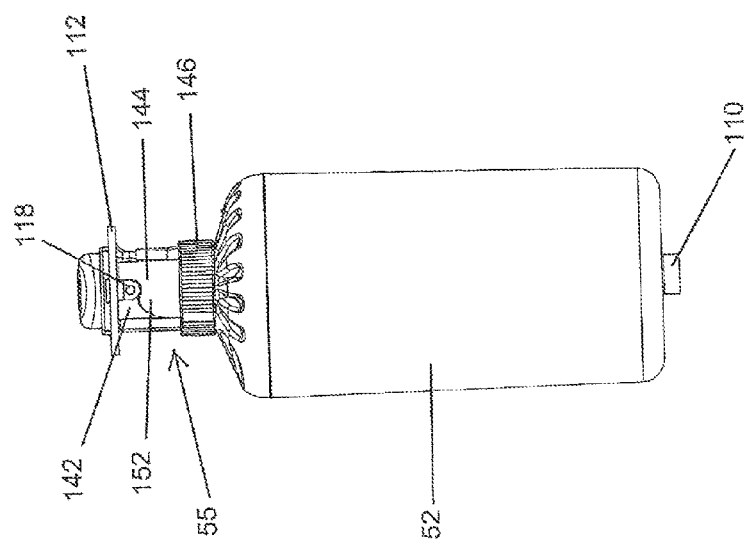
Figure 15:
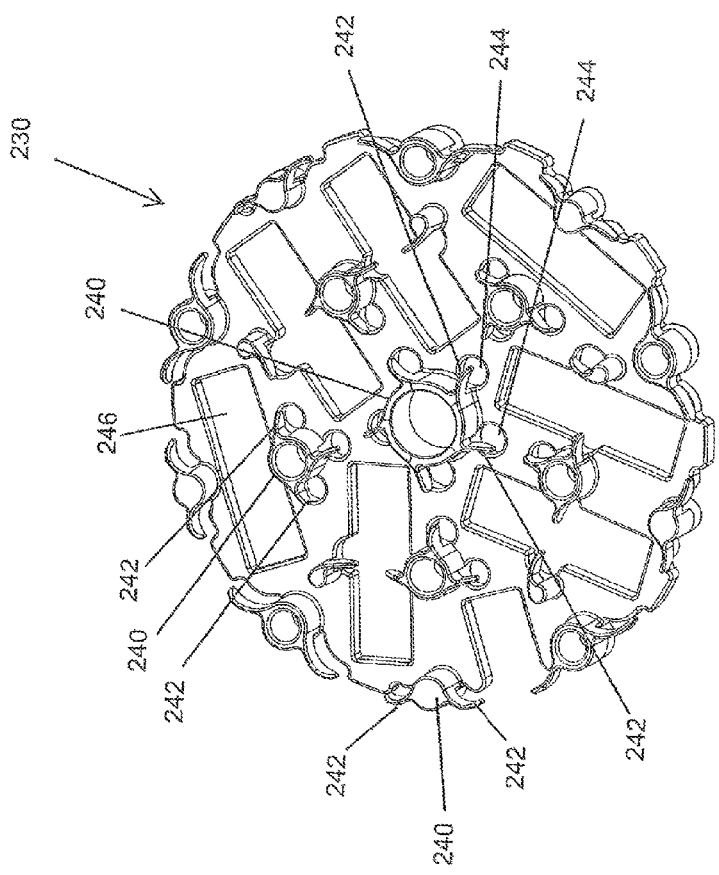
Figure 14:
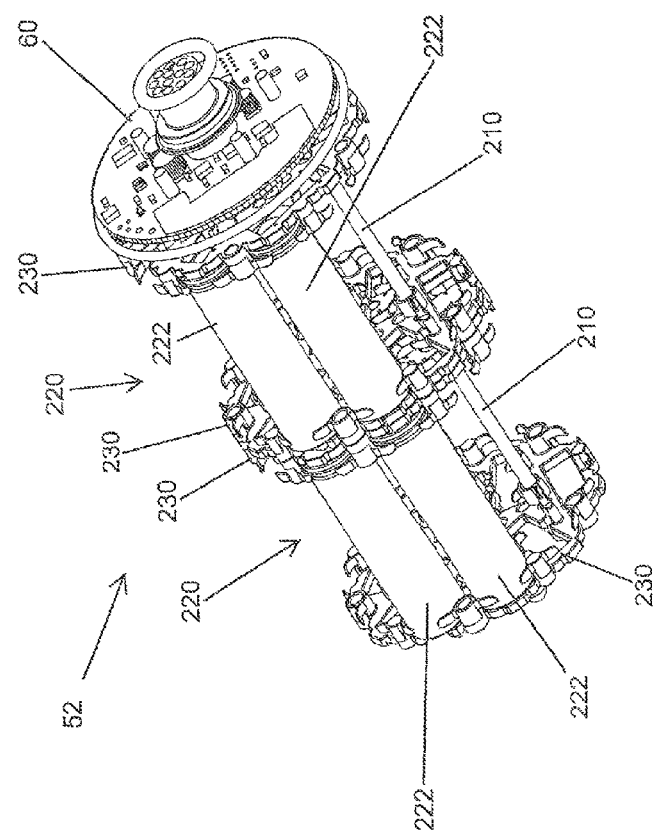
Figure 17:
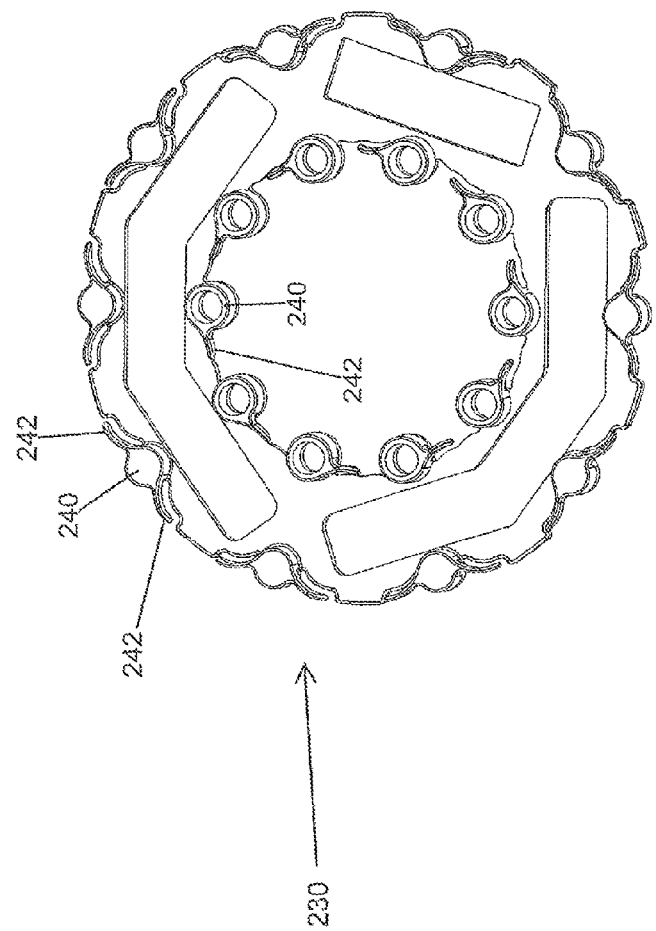
Figure 16:
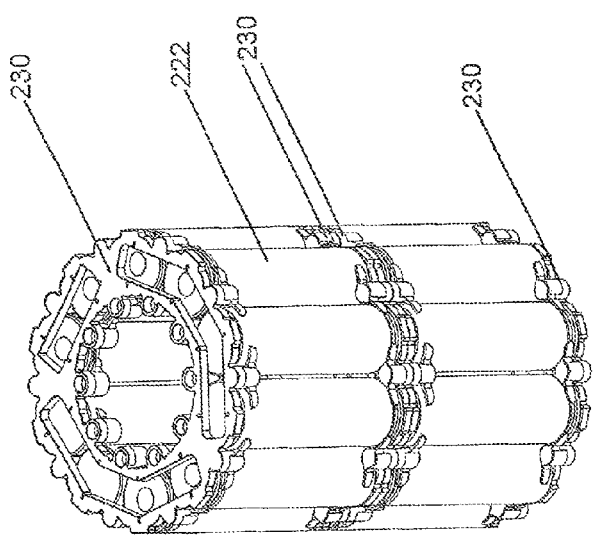
Figure 21:
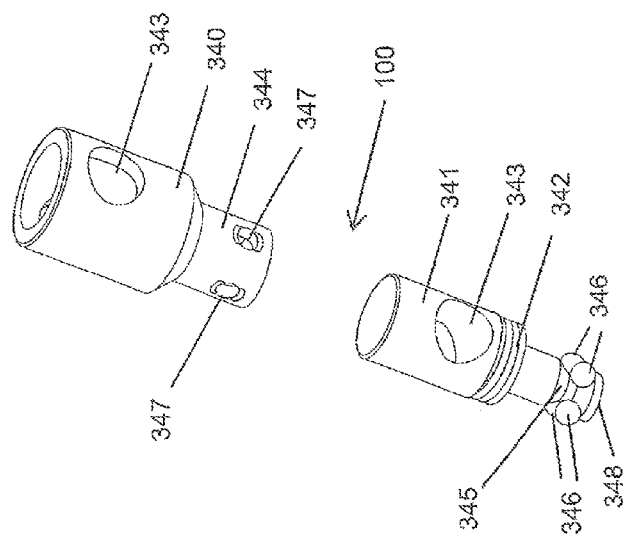
Figure 20:
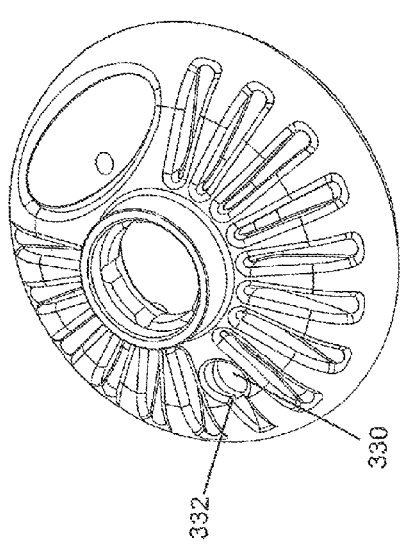
Figure 22:
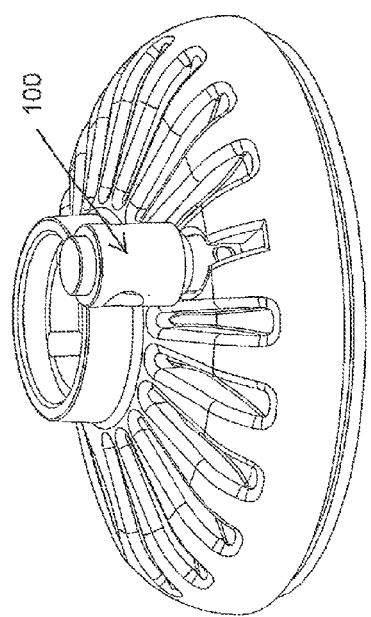
Figure 23:
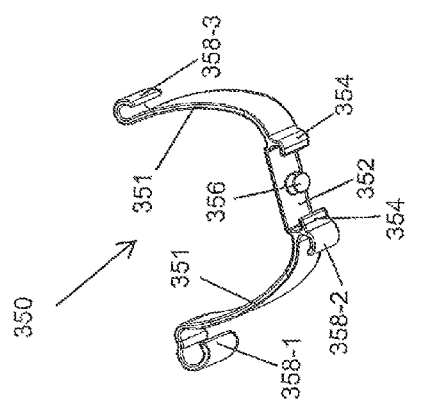
Figure 25:
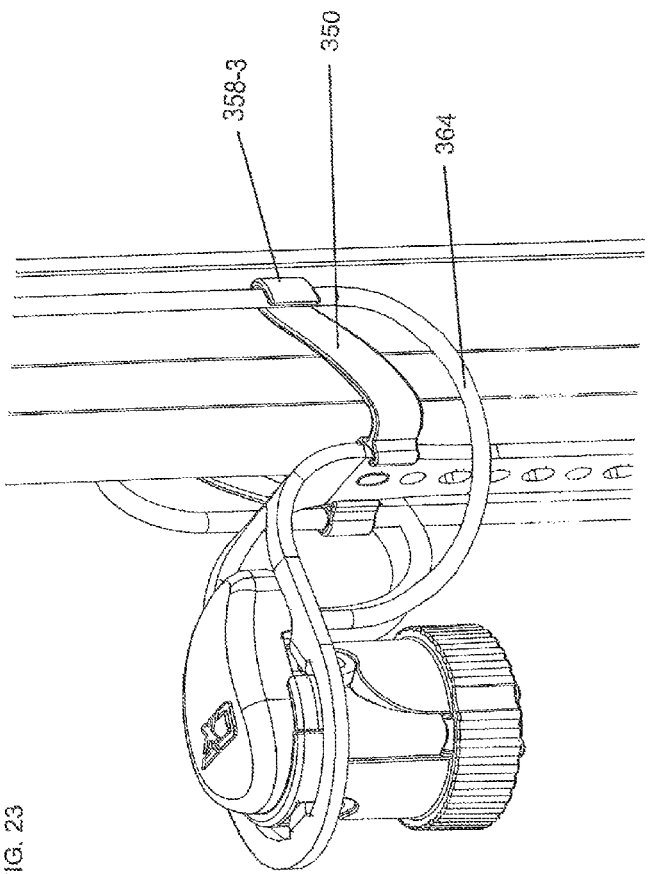
Figure 24:
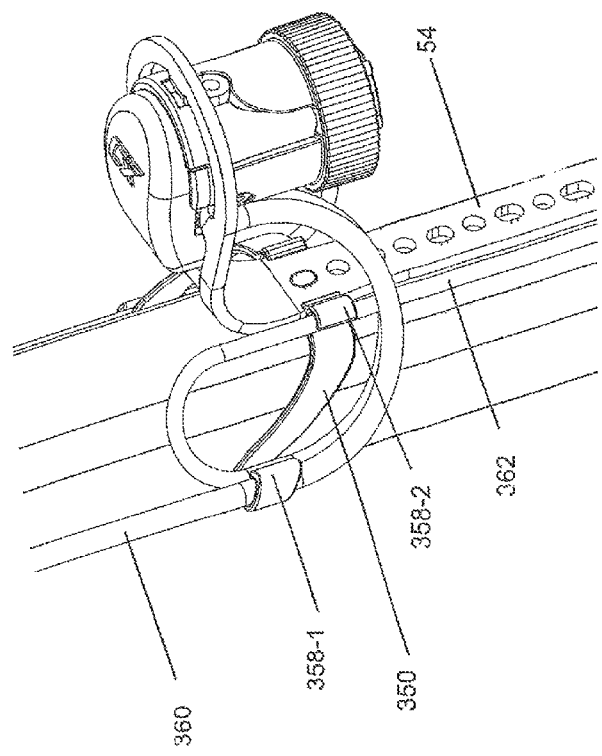

FIGS. 9(A) to 9(C) show an example of inserting the battery pack into the battery holder and operating the connector portion to form an electrical connection and clamp the battery pack into the holder;

FIGS. 10 and 11 show two examples of rotating parts for a connector portion;

FIG. 12 shows a top view of a top cap of the battery pack;

FIG. 13 shows a side view of the top cap of the battery pack;

FIG. 14 illustrates the inside of the battery pack;

FIG. 15 shows an example of a cell holder for holding battery cells within the battery pack;

FIGS. 16 and 17 show a second example of the inside of a battery pack and a cell holder;

FIG. 18 shows the battery pack fitted with a locking member for securing the battery pack;

FIG. 19 shows the locking member in more detail;

FIGS. 20 to 22 show another example of the top cap of the battery pack and a locking member for locking to the top cap;

FIG. 23 shows a cable guide for guiding wiring down the frame of a cycle, and preventing rattling of the battery holder; and FIGS. 24 and 25 show the cable guide fitted on the frame of a cycle.

Figure 26:
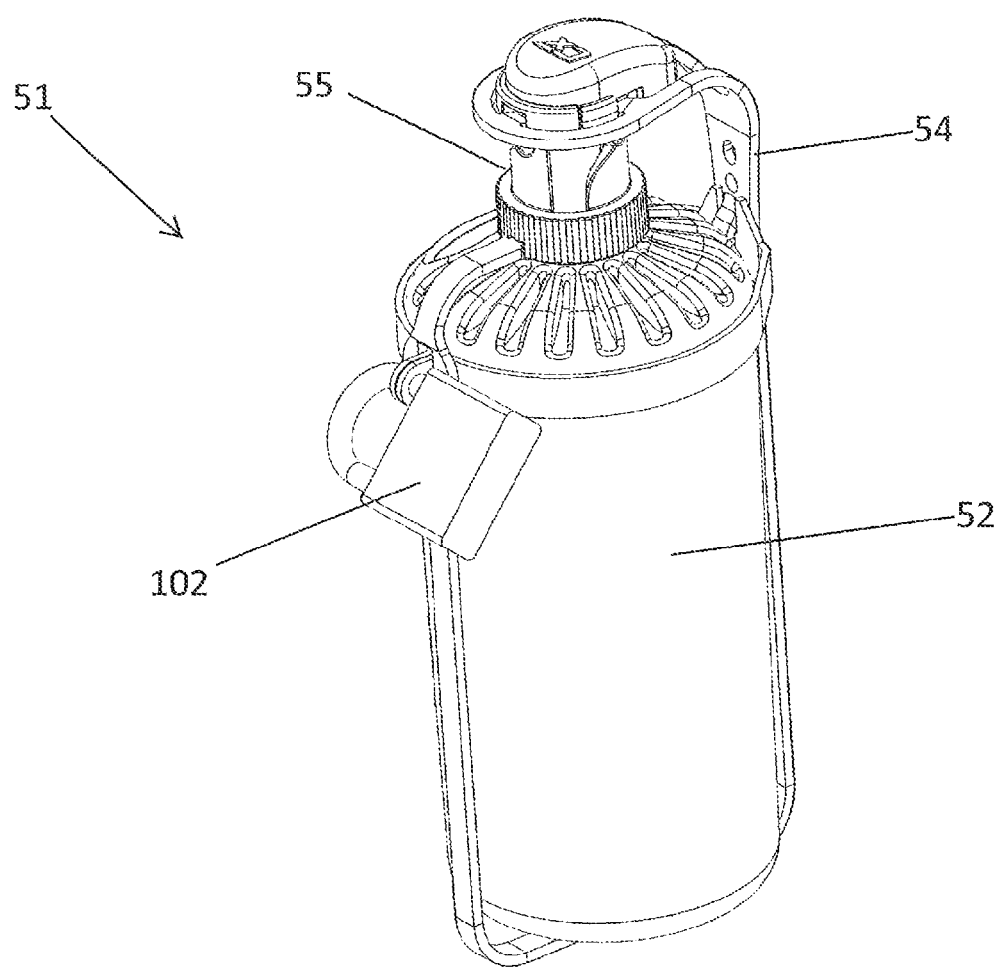

FIG. 26 shows a second example of a battery assembly.

Figure 27:
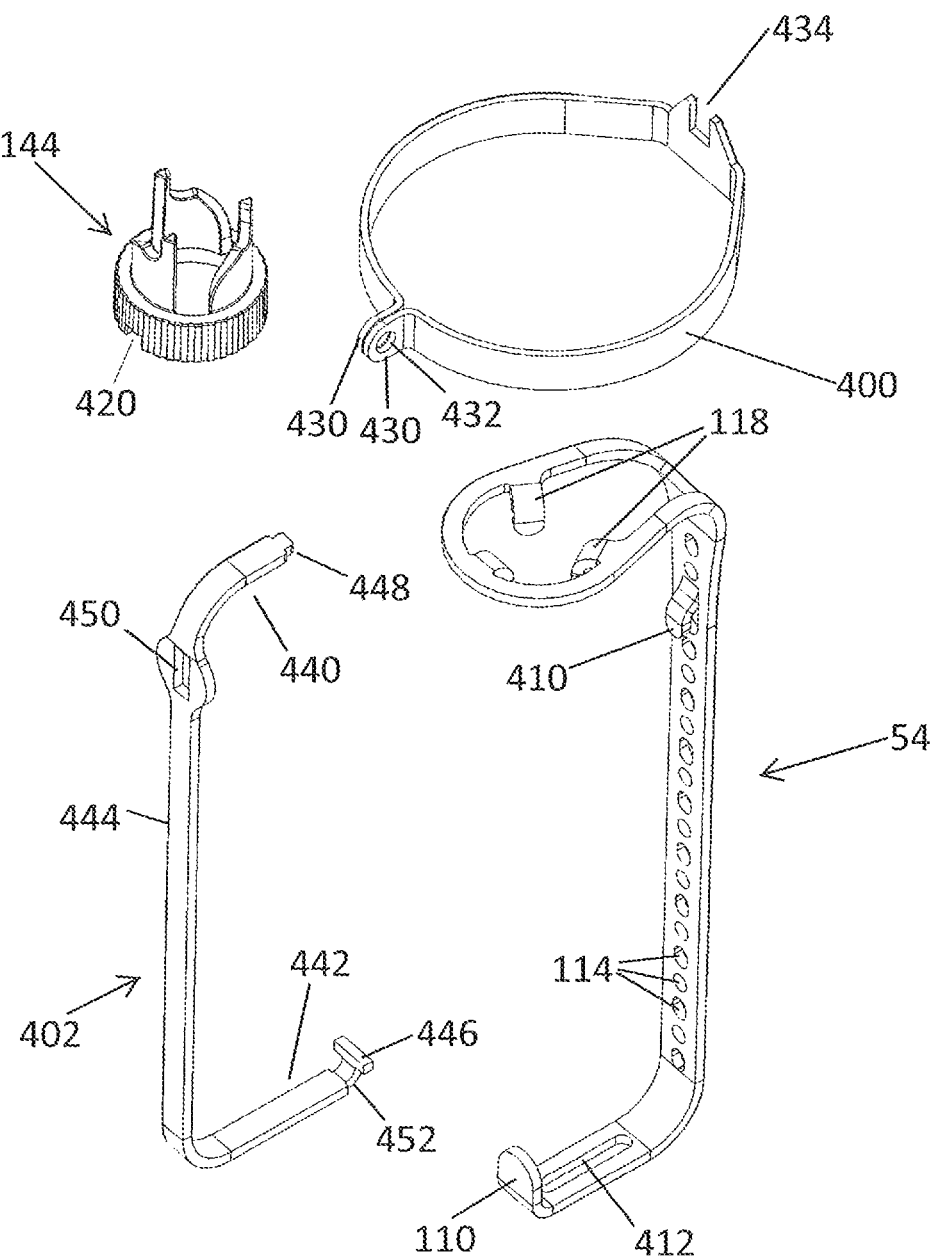

FIG. 27 shows components for locking the battery pack to the battery holder in the second example.

Figure 28B:
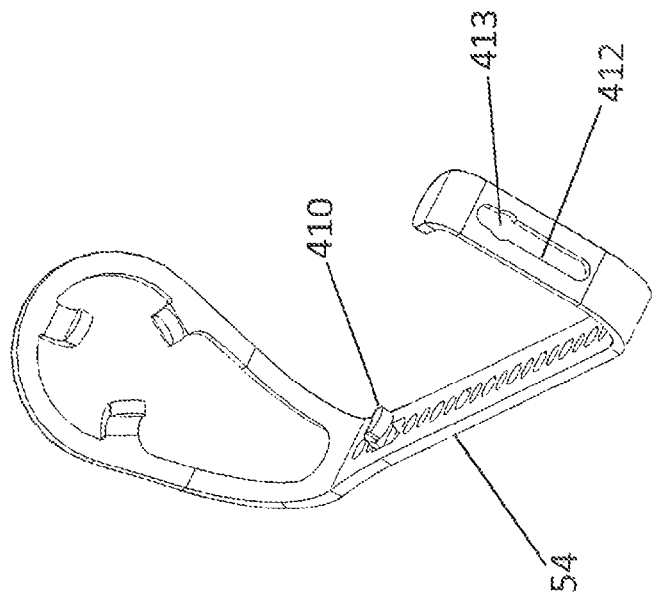
Figure 28A:
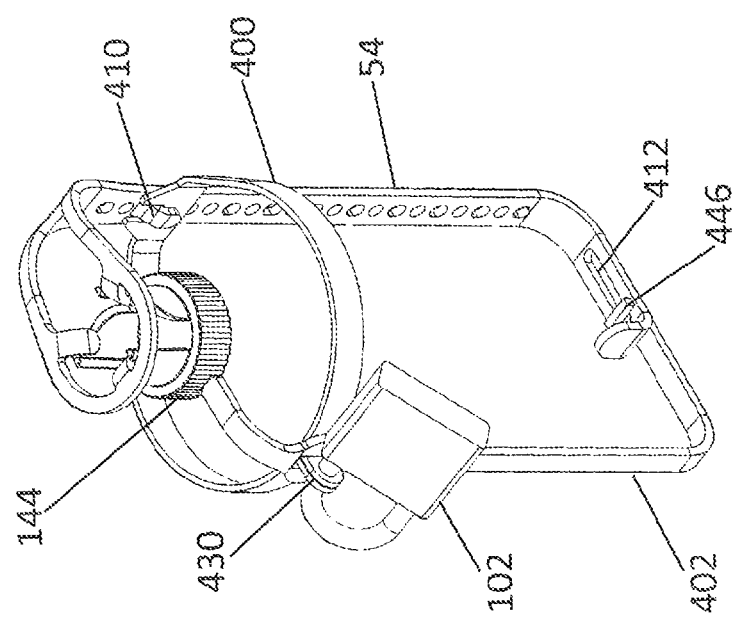

FIG. 28A shows interaction between the locking components when the battery pack is locked to the battery holder.

FIG. 28B shows an alternative design for the cage.

Figure 29:
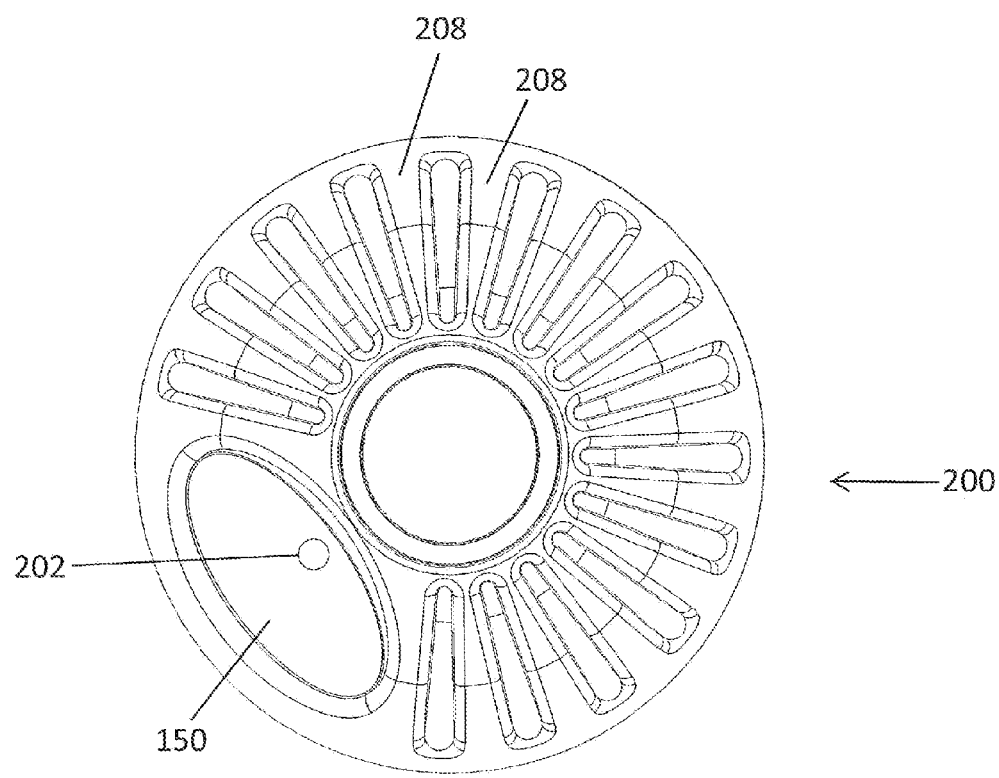

FIG. 29 shows a top cap of the battery pack in the second example.

Figure 30B:
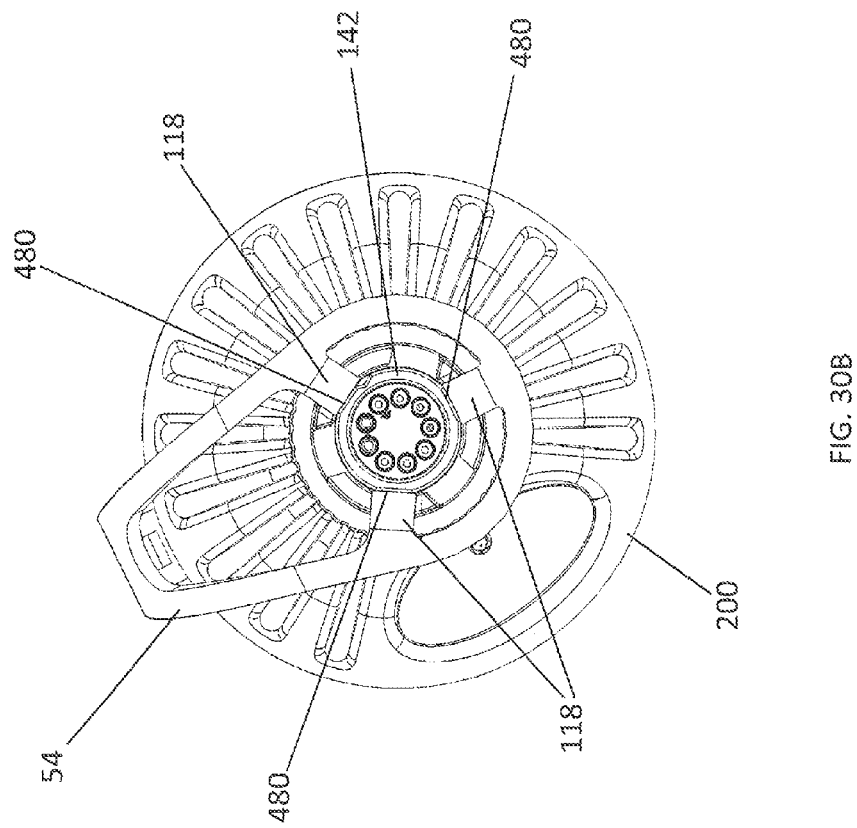
Figure 30A:
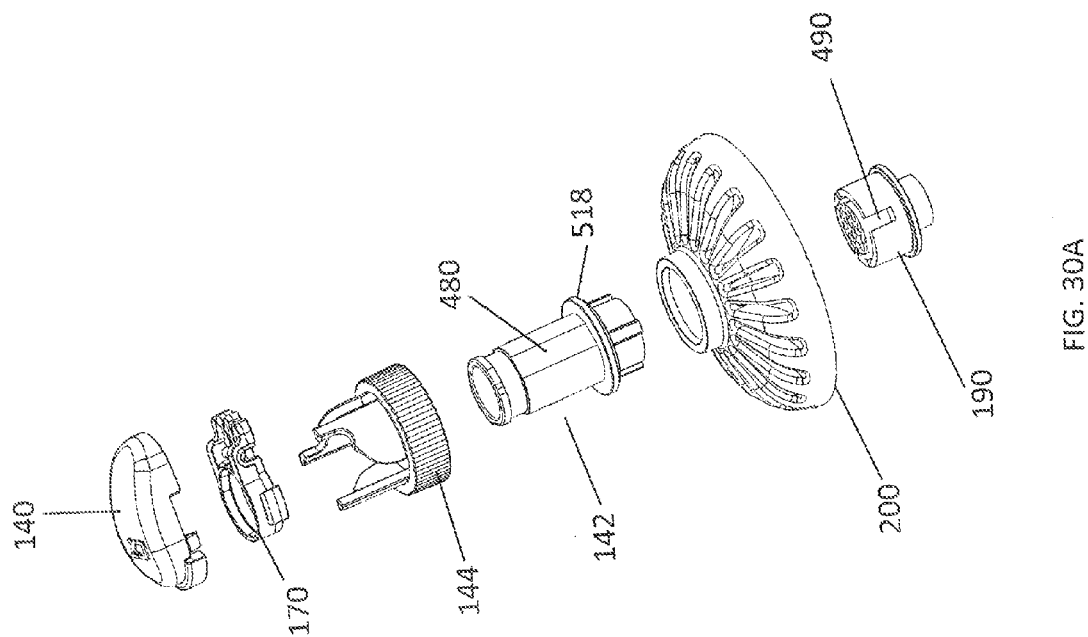

FIG. 30A shows an exploded view of the connector portion in the second example.

FIG. 30B shows an end view of the connector portion in the second example.

Figure 31:
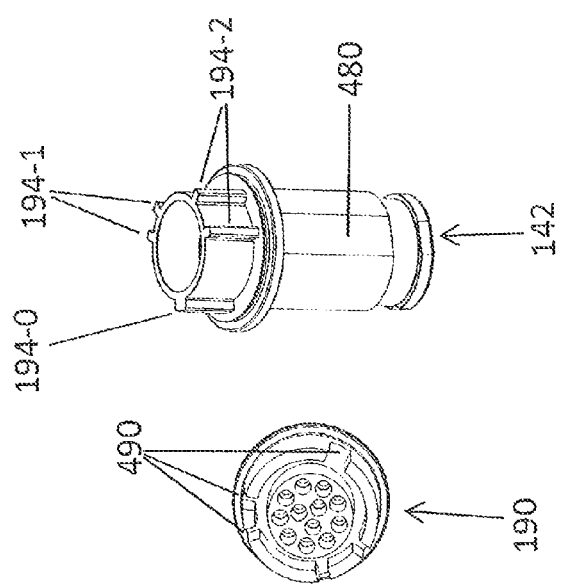

FIG. 31 shows a connector plug and guide portion of the connector portion used in the second example.

Figure 32A:
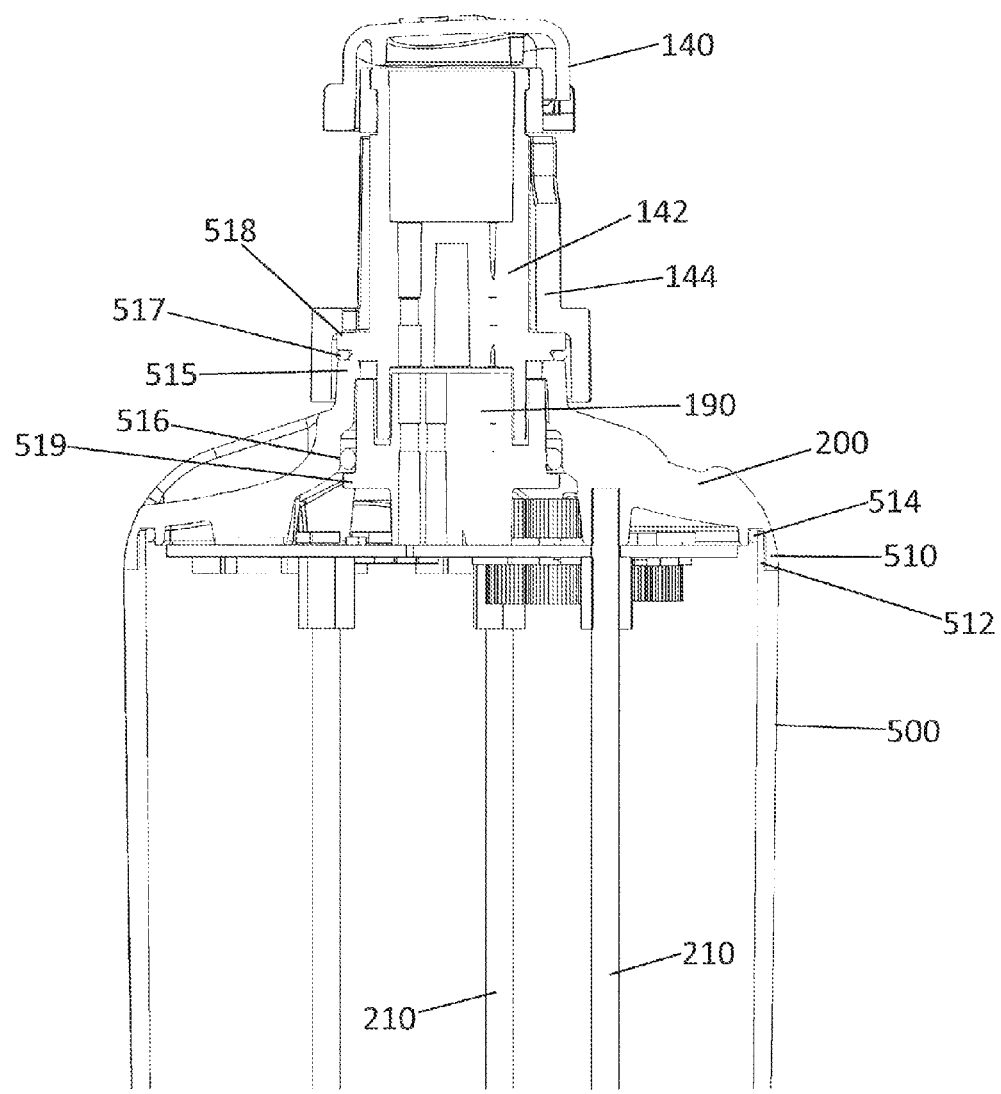
Figure 32B:
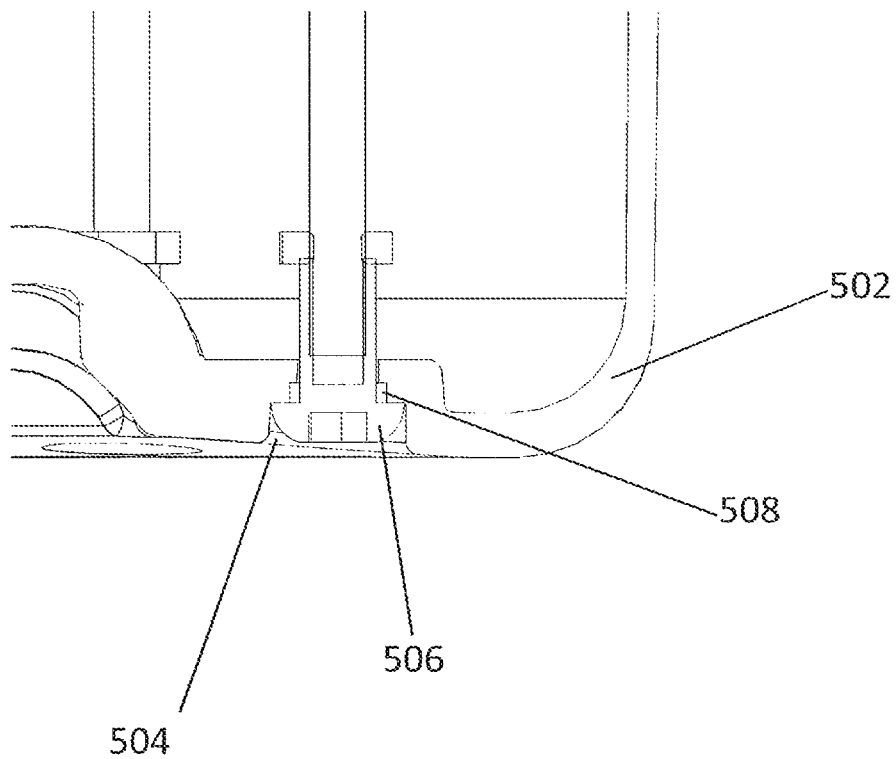

FIGS. 32A and 32B show a cross-section through the battery assembly in the second example, with FIG. 32A showing a cross-section of the upper end of the battery assembly and FIG. 32B showing an enlarged view of one of the fixings for fixing the base of the battery pack.

Figure 33:
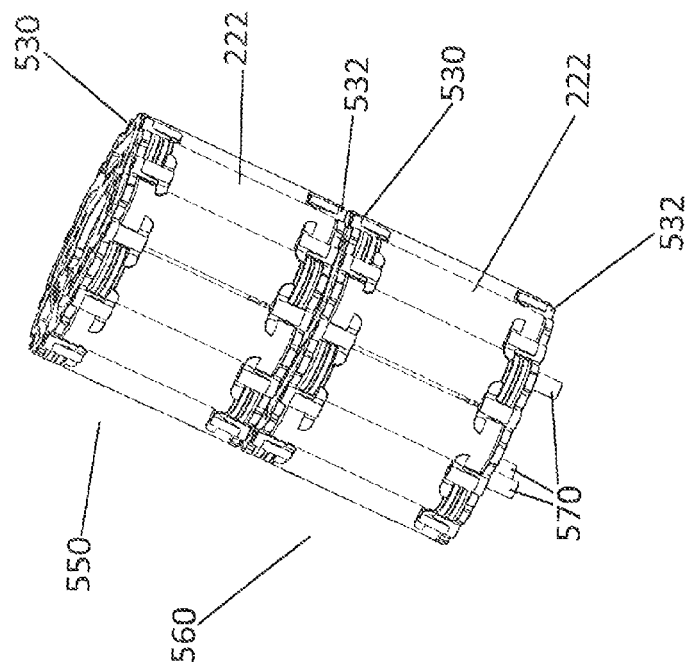

FIG. 33 shows two layers of battery cells within the battery pack in the second example.

Figure 34:
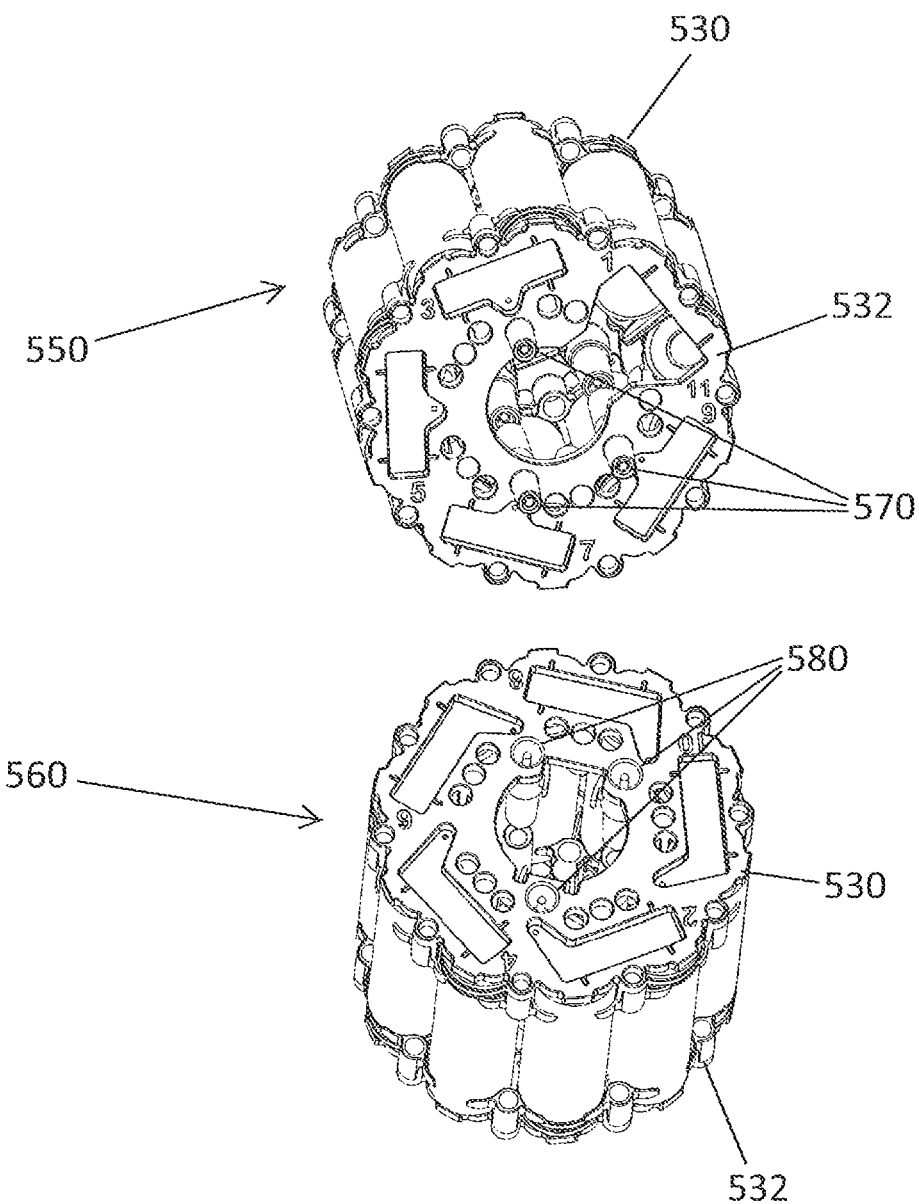
Figure 35:
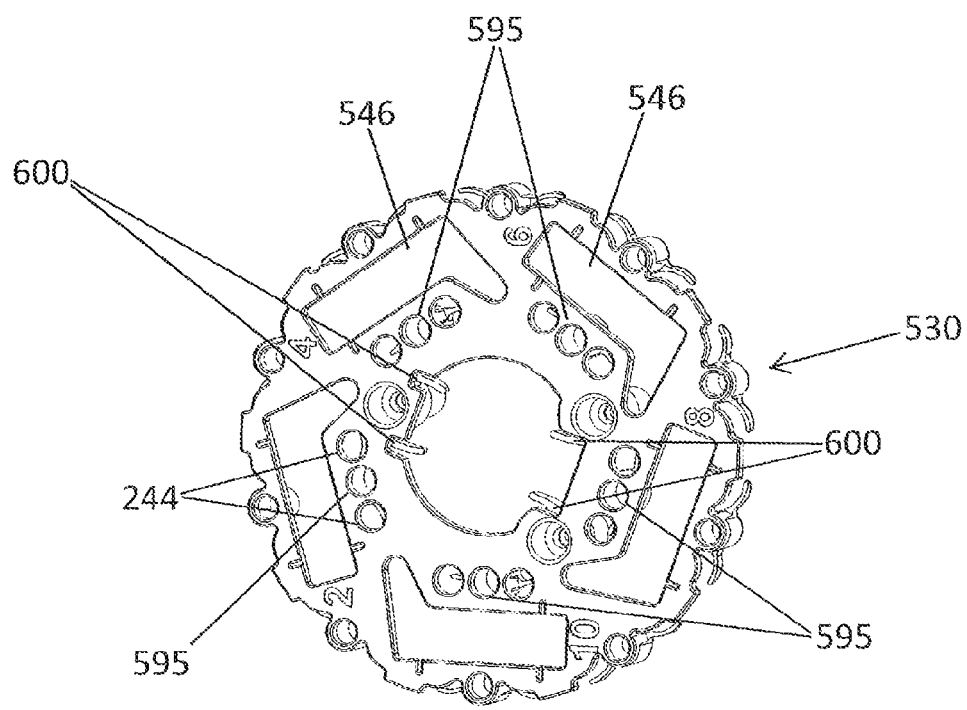
Figure 36:
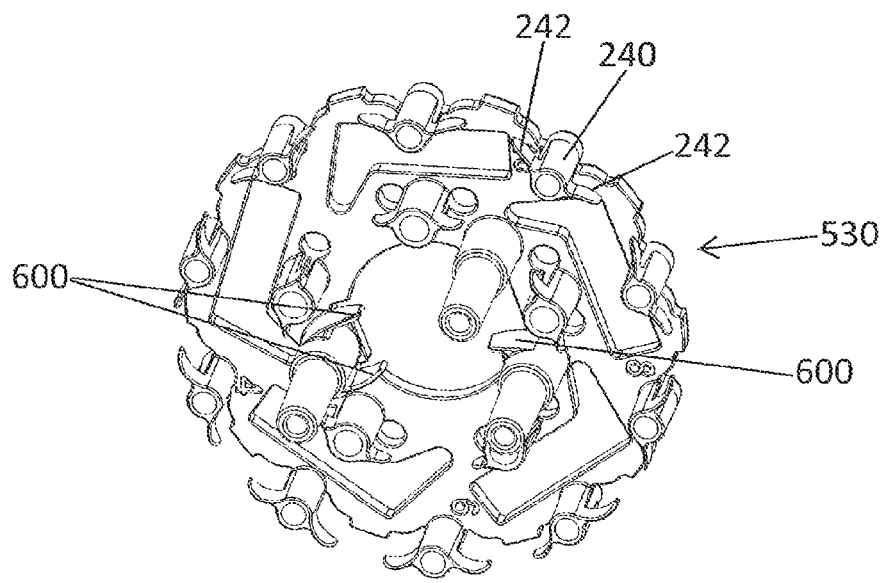
Figure 37:
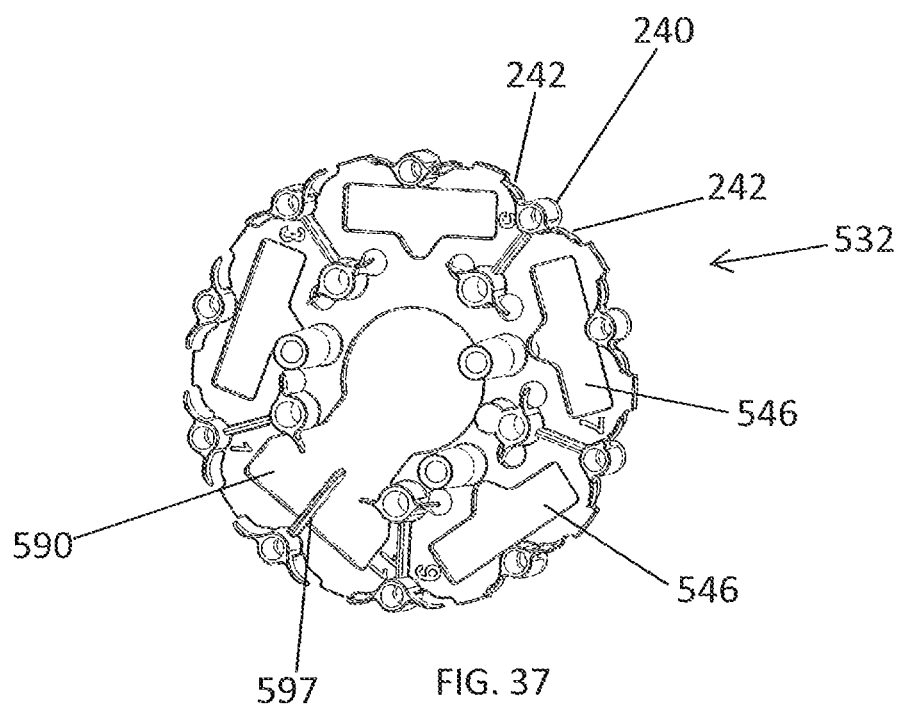
Figure 38:
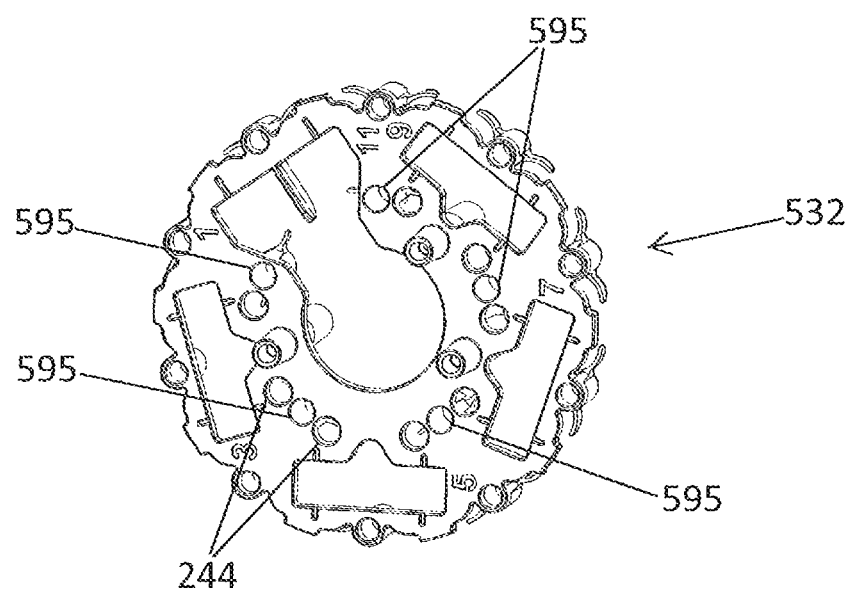

FIG. 34 shows the underside of the upper layer of battery cells and the top side of the lower layer of battery cells;

FIG. 35 shows a top view of an upper cell holder in each layer of battery cells;

FIG. 36 shows a bottom view of the upper cell holder;

FIG. 37 shows a top view of a lower cell holder in each layer of battery cells;

FIG. 38 shows a bottom view of the lower cell holder; and

Figure 39:
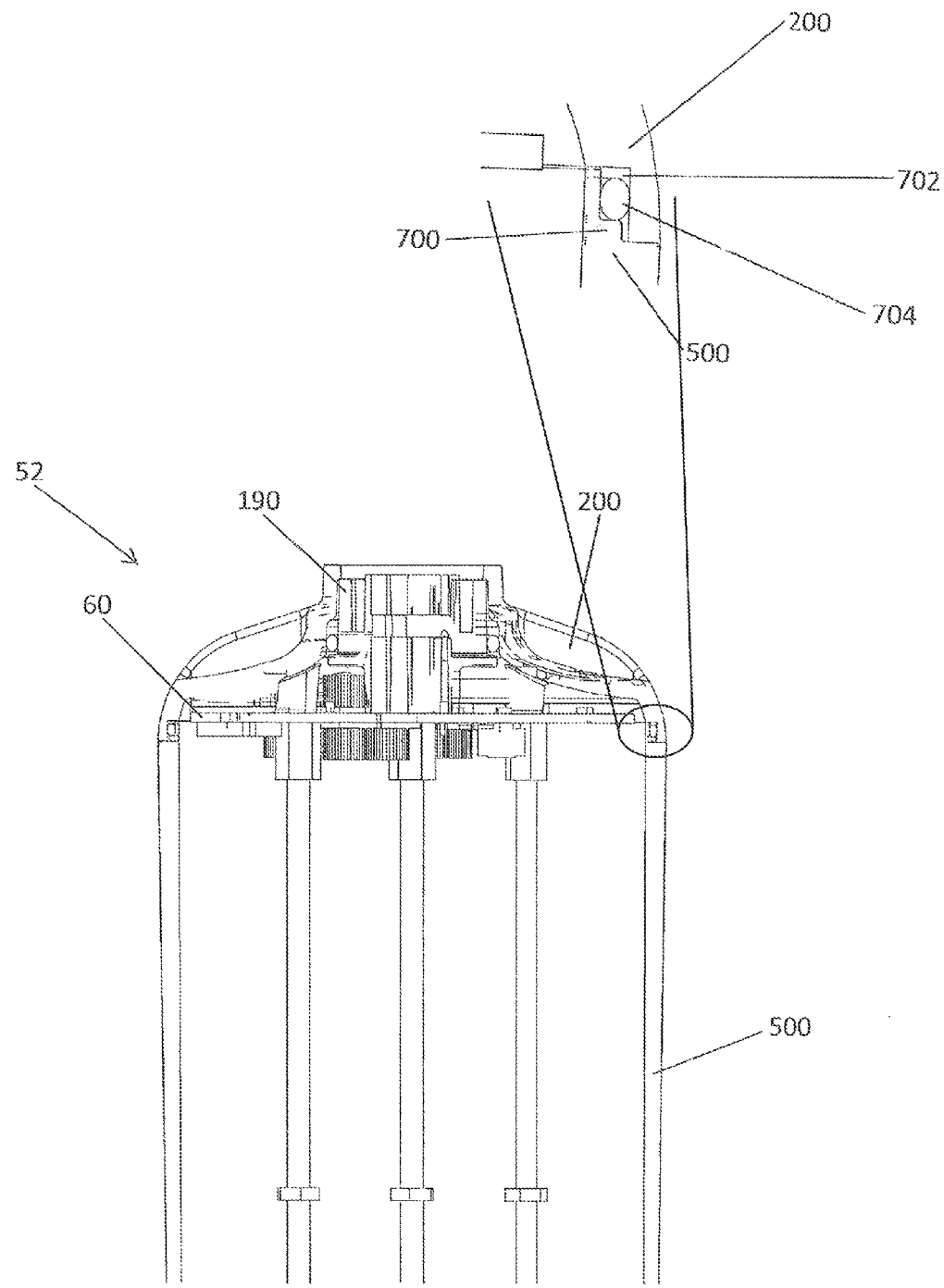

FIG. 39 shows a cross-section through the battery pack showing another example of sealing the top cap to the casing of the battery pack.

Figure 1:
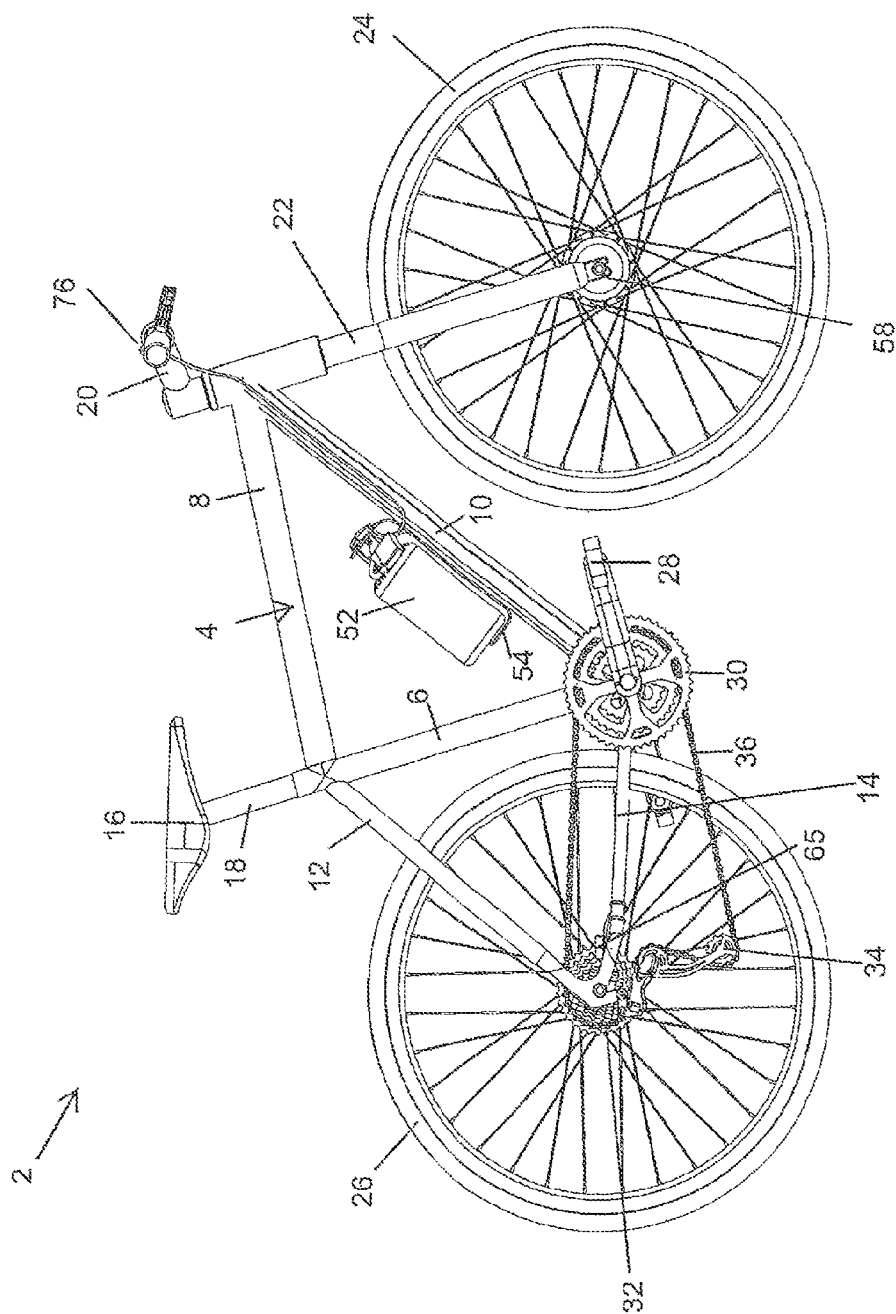

FIG. 1 schematically illustrates an example of a pedal cycle 2. While FIG. 1 shows a bicycle, it will be appreciated that the present technique could also be applied to other types of cycles such as a tricycle, tandem or motorcycle. The pedal cycle 2 comprises a frame 4 including a seat tube 6, top tube 8, down tube 10, seat stays 12, and chain stays 14. The cycle 2 also includes a saddle 16, seat post 18, handle bars 20, front fork 22, front wheel 24, rear wheel 26, pedals 28, front sprockets or chain rings 30, rear sprockets 32, derailleur 34 and chain 36.

To provide assistance with pedal cycle motion, the cycle 2 is fitted with an electrically assisted cycle kit 50. The kit 50 is shown functionally in FIG. 2 and shown fitted to the cycle 2 in FIG. 1. By fitting the components of the cycle kit 50 to the cycle 2, a standard cycle 2 can be converted into an electrically assisted cycle. The cycle kit 50 includes a battery 52 for providing power to the other elements of the cycle kit 50. In FIG. 1, the battery 52 is shown mounted in a cage 54 fitted to the down tube 10 of the frame 4, in a similar way to a cage for a water bottle. In other examples, the battery may be connected to other portions of the frame 4 (for example, the seat tube 6) and need not be formed in the shape of a water bottle. The kit 50 is also provided with a battery charger 56 for recharging the battery 52.

The kit 50 also includes an electric motor 58 for providing electrical assistance for pedal cycle motion. In the example of FIG. 1, the motor 58 is a hub motor fitted to the front wheel 24 of the cycle 2, but in other embodiments a crank drive motor or a rear wheel drive motor can be used. A brushless sensorless hub motor is particularly preferred for its reliability, low cost and efficient operation. Also, the motor could be a direct drive motor, or a motor with gearing inside a hub (e.g. planetary gearing) to match the speed needed for cycling.

The cycle kit 50 also includes a controller 60 for controlling the operation of the various components of the cycle kit 50. The controller 60 controls the drive of the electric motor 58. In the example shown in FIG. 1, the controller 60 is provided within the casing of the battery 52, but it will be appreciated that in other embodiments the controller 60 may be located at any location on the cycle 2, such as on the down tube 10 or within the battery cage 54 or motor 58 for example.

A gear tooth sensor 65 is provided for sensing motion of the teeth and valleys of a gear sprocket 32 of the cycle 2. In the example of FIG. 1, the gear tooth sensor 65 is mounted on the chain stay 14 of the frame 4 to sense the motion of one of the rear sprockets 32. However, in other embodiments the gear tooth sensor 65 may be mounted to a different part of the frame or to the rear axle of the cycle 2, and may sense motion of one of the front chain rings 30 instead of the rear sprockets 32. Preferably, the gear tooth sensor 65 may be fitted to sense the teeth and valleys of the largest rear sprocket 32. This is useful since the largest rear sprocket 32 has more teeth and valleys than the other sprockets and so the gear tooth sensor 65 can detect changes in pedaling speed and acceleration with greater sensitivity. However, other sprockets may also be used, for example if the largest sprocket is not ferrous (typically smaller sprockets are more likely to be ferrous because they experience wear), or if using a smaller sprocket makes it easier for the sensor 65 to be positioned so that it does not get in the way of the chain 36. The gear tooth sensor 65 provides a gear motion signal to the controller 60 and the controller 60 controls the drive of the electric motor 58 based on the gear motion signal. The speed/acceleration of motion of the teeth and valleys of the gear sprocket 32 is representative of the speed/acceleration of pedaling by the cyclist, since the sprocket 32 rotates when the pedals rotate. Therefore, by controlling the motor drive based on the sensed speed/acceleration of motion of the gear sprocket 32, the assistance provided by the motor 58 can be controlled in a way that is appropriate to the cyclist's pedaling. The gear tooth sensor 65 may be a magnetic sensor which senses the ferrous teeth of the sprocket 32. The gear tooth sensor may include a Hall sensor which uses the Hall effect to sense changes in a local magnetic field caused by ferrous objects. Further details of the gear tooth sensor 65 and the control of the motor drive by the controller 60 may be found in the published European patent application EP 2657119 A1 filed by Modern Times Ltd, the entire contents of which are hereby incorporated by reference.

A user input 76 is also provided to enable the cyclist to control whether or not electrical assistance is provided by the motor 58. For example, the user input 76 may be mounted on the handlebar 20 of the cycle 2. The user input 76 may for example be an on/off button for switching on and off the power assistance. For example, a tactile momentary button may be used which produces different functions by momentary presses or by holding down the button. In other examples the user input 76 may comprise further controls and/or methods for adjusting parameters or changing mode of the cycle kit 50.

The cycle kit 50 may optionally also include other elements which are not required for providing electrical assistance but may conveniently be powered using the battery 52. For example, the kit 50 may include a cycle computer 80 for providing the cyclist with data such as the cycle speed, distance traveled, and so on. Also, front or rear lights 84 may be powered using the battery 52.

Figure 2:
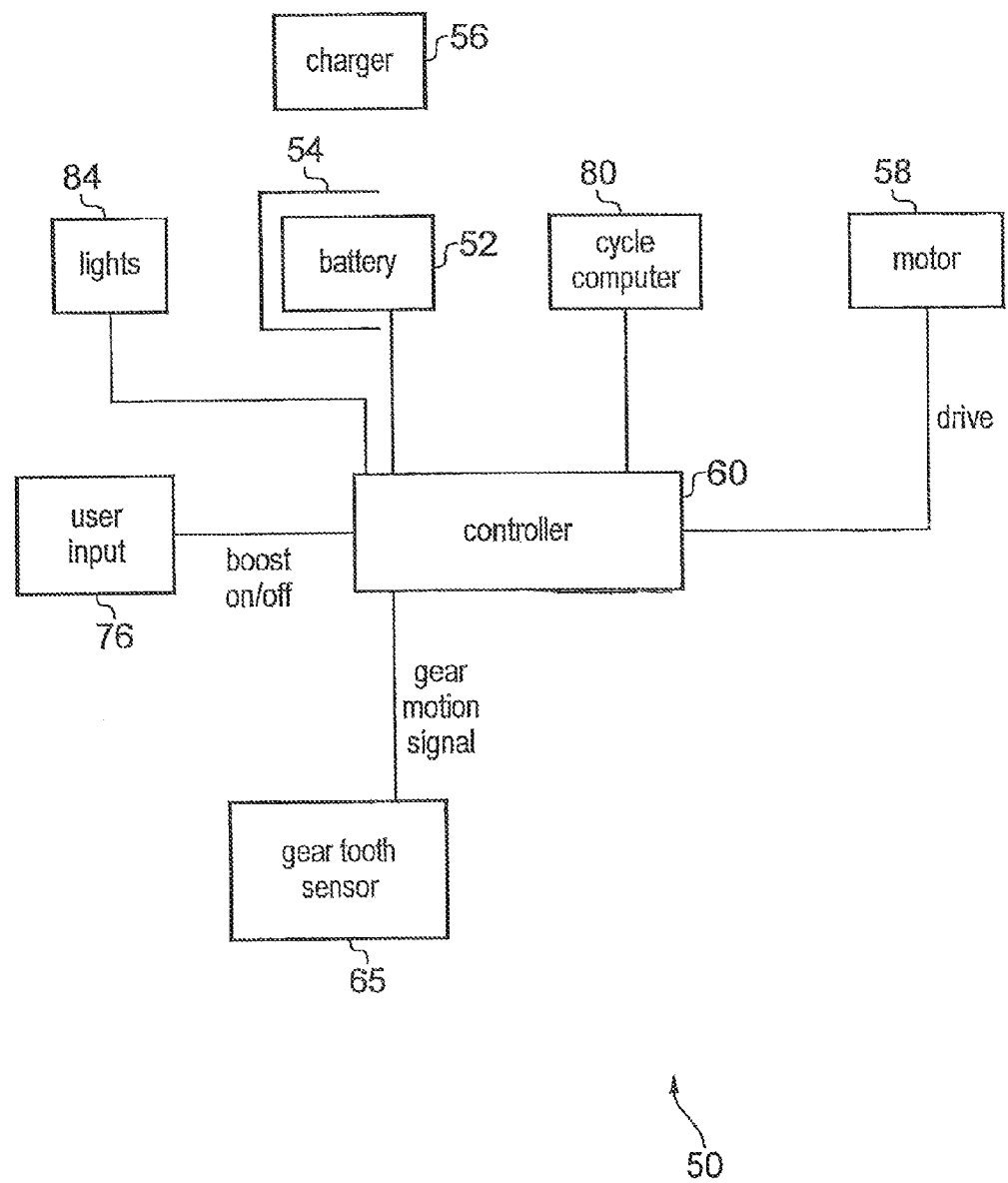
FIG. 2 illustrates an example of an electrically assisted cycle kit for fitting to a cycle.

The cycle kit 50 also includes the various wires and connectors for forming electrical connections between the different elements of the system. The wires may be run along the frame 4 of the cycle 2 when fitting the kit 50 to the cycle 2, or may be provided internally within the frame 4. Although FIG. 2 shows a system in which, to reduce the amount of wiring, the battery 52 is connected to the controller 60 and the power for the other elements of the kit 50 is distributed from the battery 52 via the controller 60, in other embodiments some elements may be connected directly to the battery 52.

The battery 52 and cage 54 (or battery holder) are part of a battery assembly 51 for fitting to a cycle. While in the example of FIGS. 1 and 2 the battery assembly forms part of an electrically assisted cycle kit 50 for retrofitting to a cycle, in other examples the battery assembly may be provided as part of a standalone electric bike which is designed specifically for electrical assistance, rather than as part of a retrofitting kit. However, the battery assembly which will be discussed below is particularly useful for a kit 50 because of its compact design and simple operation by the user, which means it can be fitted to a wide range of bikes with different sizes and configurations of frames and is convenient to remove or insert the battery from the holder 54.

FIG. 3 schematically shows the battery assembly 51 in more detail. The battery assembly 51 includes the battery pack 52, a battery holder (cage) 54, and a connector portion 55 which is slideable relative to the battery holder 54 to clamp the battery pack 52 into the holder 54 and form an electrical connection between the battery of the battery pack 52 and wiring 90 for connecting to various components of the cycle or the cycle kit. For example the wiring 90 may be connected to the motor 58, cycle computer 80, user input button 76, gear tooth sensor 65, and so on. As shown in FIG. 3, the battery assembly may also optionally include a locking member 100 for securing the battery pack 52 to prevent theft. The locking member may receive a lock 102 (e.g. a padlock, cable or chain) for securing the locking member (and hence the battery pack) to either the battery holder 54, the connector portion 55, a bicycle lock, or an external object such as a railing or bike stand. The locking member 100 will be explained in more detail below.

FIG. 4 shows the battery holder in more detail. The battery holder 54 comprises a cage which has a protruding portion 110 or hook at one end and a neck portion 112 at the other end for receiving the connector portion 55. Between the protruding portion 110 and the neck portion 112 is a bar with multiple fixing holes 114 which allow the battery holder 54 to be mounted at different positions relative to the frame. For example a bicycle frame will typically have some fixings provided on the frame for fitting a water bottle and these can be used to fit the battery assembly 51. As different frames may have different sizes, providing multiple fixing holes 114 in the battery holder 54 allows the battery holder 54 to be moved up and down the frame to ensure that the battery pack 52 fits within the space available, and to take up any slack in the wiring 90 to avoid large loops of wiring or to avoid placing strain on wiring by over-tensioning the wiring.

The neck portion of the battery holder 54 has engaging portions 118 for engaging with cam portions of the connector portion 55 as will be discussed below. In this example the engaging portions 180 are in the form of three lugs which extend inwardly from the loop of the neck portion 112. The engaging portions have a hole 120 for receiving a ball which slides between the engaging portion and a groove of the connector portion.

FIG. 5 shows a part of the casing of the battery pack 52. The lower part of the casing has an indented portion 130 which has a hemispherical profile. Also within the hemispherical indent is a slot portion 132. When the battery pack 52 is inserted into the battery holder 54 then the protruding portion 110 of the battery holder 54 engages with the indent 130 of the battery pack 52 to centrally position the battery pack 52 relative to the holder 54. Since the indent curves inwards, the user can easily find the indent and the indent will guide the battery pack into the centre of the battery holder. To help with this, the area surrounding the indent may also taper inwards towards the indent, e.g. with a conical shape. The protruding portion 110 of the battery holder 54 has a curved end profile so that it can slide along the curved surface of the indent 130 of the battery pack 52 to allow the battery pack to be tilted into the battery holder from an angled position to an in use position (see FIG. 9). Also, when viewed from the side the protruding portion 110 has a flat profile 124 which engages with the slot 132 in the battery pack 52 to align the battery pack in a desired orientation. The slot portion 132 of a battery can be aligned such that when the protruding portion is in the slot then the battery will be in one of two orientations possible with respect to the connector portion 55. If only one of these orientations is suitable for connecting the connector portion 55 to the battery pack 52, then another means can be provided to provide the correct orientation. For example, as shown in FIG. 12, the top cap of the battery pack may have an asymmetric design with for example a makers label 150 on one side of the cap. The user may be instructed that when the battery pack is fitted in the correct orientation, the makers label should point to one side of the frame and not the other, so that the user knows that, when the protruding portion 122 of the battery holder 54 is in the slot 132 of the battery pack 52, then provided that the label 150 on the top of the battery pack is pointing in the right direction then the battery will be correctly aligned. Hence, when inserting the battery, after the protrusion 110 is located in the indent 130, the battery pack merely needs to be twisted a little until the protrusion 110 drops into the slot 132, which provides tactile feedback that it is in position (the slot 132 is indented a little deeper than the hemispherical indent 130).

Figure 6:
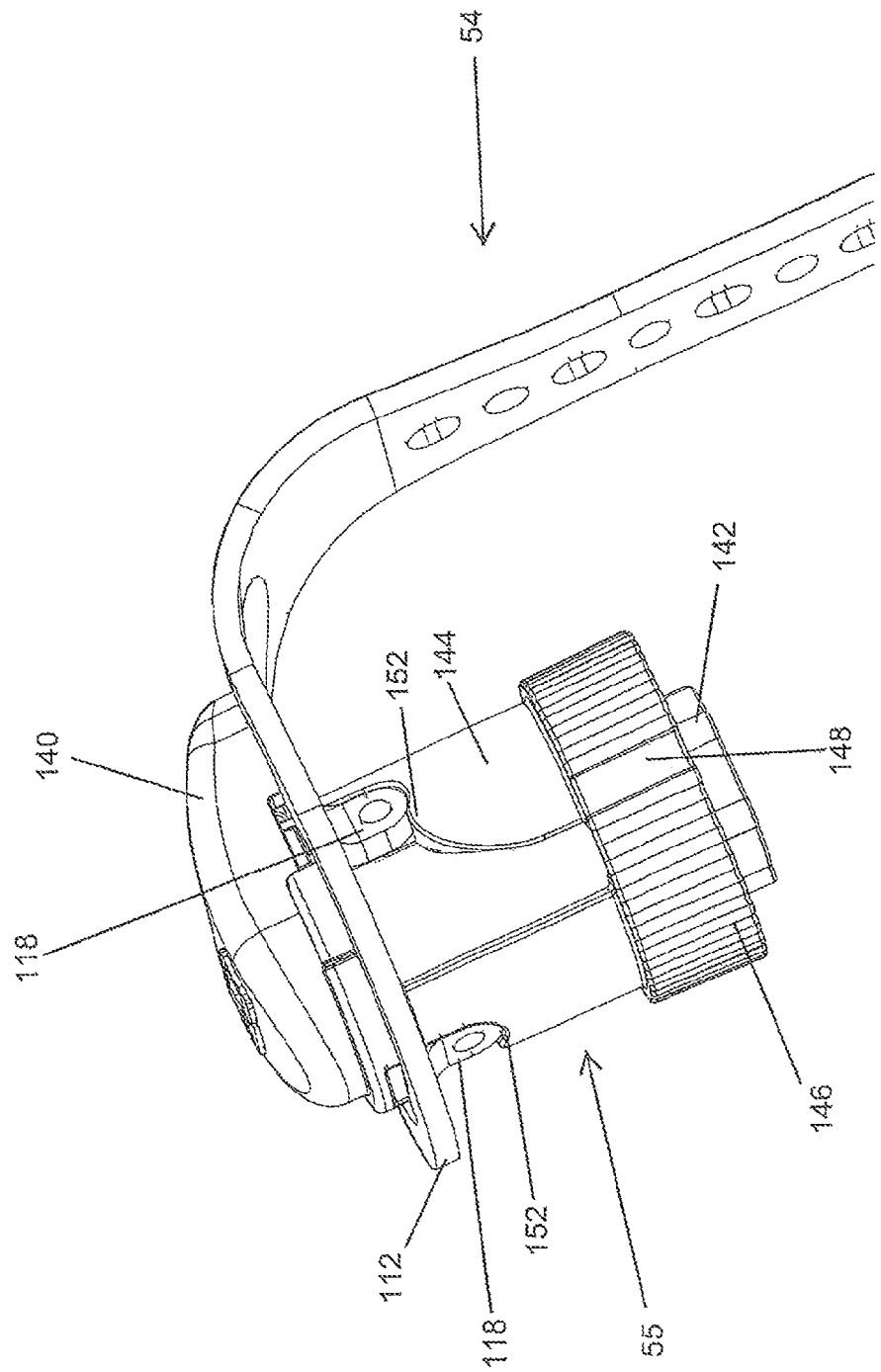
FIG. 6 shows an example of a connector portion for forming an electrical connection with the battery pack.

FIG. 6 shows the connector portion 55 of the battery assembly in more detail. The connector portion 55 fits within the loop of the neck portion 112 of the battery holder 54. A cap 140 sits over the top of the connector portion and the neck portion 112 of the battery holder to hide the wiring and protect the inside of the connector portion 55 from dust, dirt and water. The connector portion 55 includes a guide portion 142 and a rotating part 144 which rotates about the guide portion relative to the battery holder 54. The guide portion 142 houses the pins and wires for forming the connection to the battery pack. The rotating part 144 includes a finger grip portion 146 which can be gripped by the user to rotate the rotating part relative to the battery holder 54 and the guide portion 142. The finger grip portion 146 has an indent 148 in one side for receiving the locking member 100 (see FIG. 18) so that when the locking member is fitted, the rotating part 144 cannot be rotated to unclamp the battery pack.

The rotating part 144 includes cam portions 152 disposed around the edge of the rotating part 144, which engage with the engaging portions 118 of the battery holder 54. In this example there are three cam portions 152 provided on the rotating part 144 (e.g. at 120° to each other) and three corresponding engaging portions 118 provided on the battery holder 54. However, in other examples fewer or more cam portions and engaging portions may be provided. Also, in some examples the cam portions 152 could be provided on the battery holder 54 and the engaging portions 118 could be provided on the rotating part 144.

Figure 8:
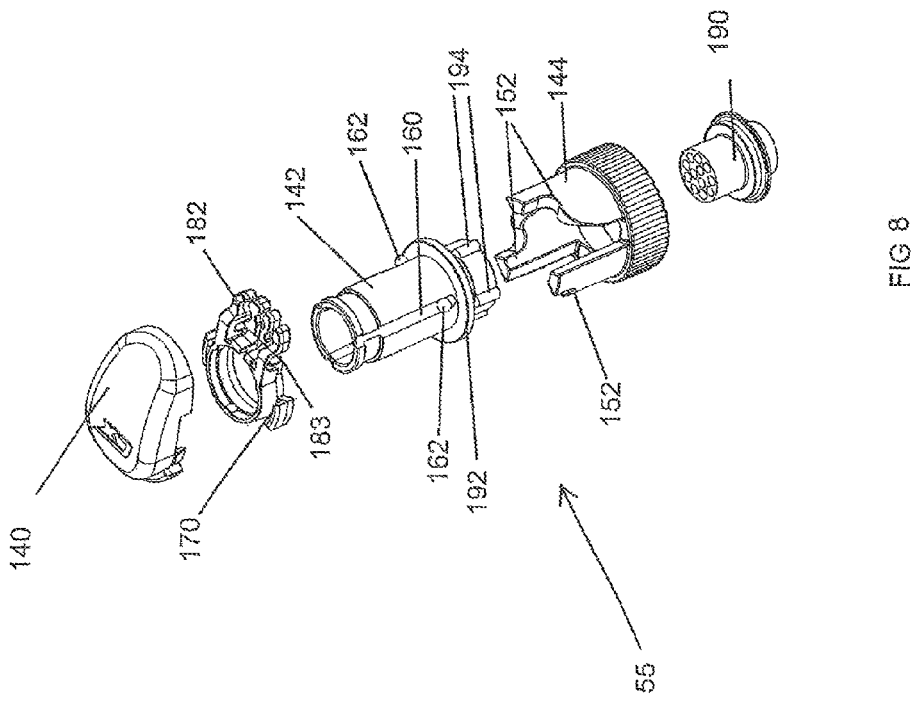
FIG. 8 shows an exploded view of the connector portion.
Figure 7:
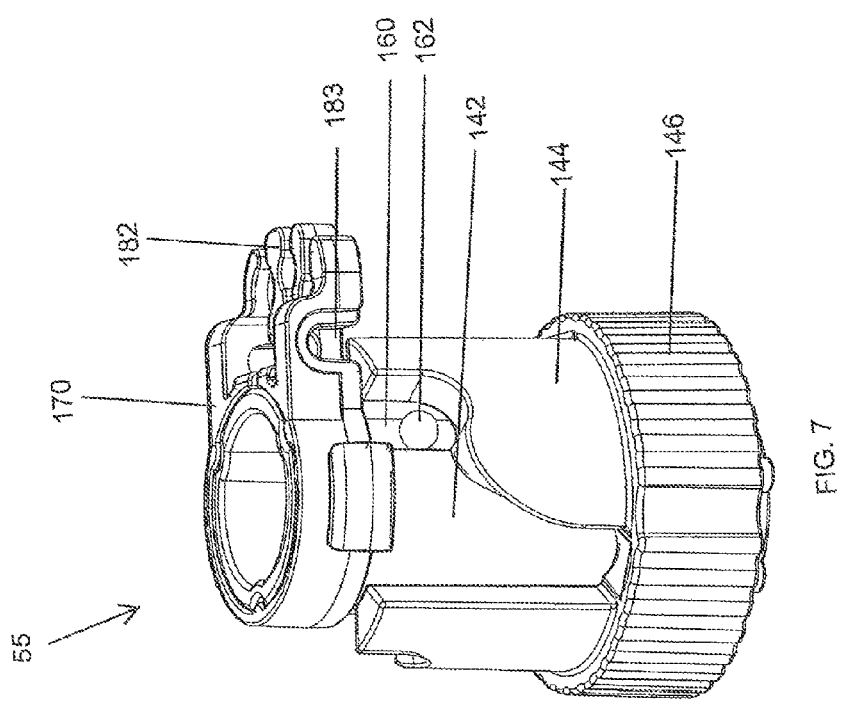
FIG. 7 shows another view of the connector portion.

FIG. 7 shows the connector portion 55 in more detail without the battery holder 54, and FIG. 8 shows an exploded view of the components of the connector portion 55. As shown in FIGS. 7 and 8, the guide portion 142 has grooves 160 running down it in an axial direction parallel to the axis of rotation of the rotating part 144. Between each groove 160 and the corresponding engaging part 118 of the battery holder 54 lies a ball 162 which rolls along the groove 160 and in the holes in the engaging part 118 to reduce friction, keep the connector portion central, and provide a nicer feel for the user than a rigid lug in a groove. The ball 162 may be made of steel, stainless steel, PTFE or nylon for example. When the user slides down and rotates the rotating part 144, the engaging portions 118 of the battery holder 54 follow the grooves 160 in the axial direction, aided by the balls 162. The engaging portions 118 slide over the cam portions 152 about the circumference of the rotating part 144, and due to the curved profile of the cam portions 152, the engaging portions 118 force the rotating part 144 down to press against a shoulder of the guide portion which in turn presses down on a mating part (neck) of the battery pack 52 to clamp the battery pack 52 into the battery holder 54. The grooves 160 and balls 162 help to retain the connector portion 55 in its original orientation when sliding downwards, so that it slides down linearly to form a secure connection. The cam portions 152 have a profile such that, once the engaging parts are over the highest point of the cam portion 152, then the cam portion 152 surface curves down again so that the engaging part 118 rests on the far side of the cam portion. This ensures that the connector portion remains in the closed position until the user rotates the rotating part 144 back round to unclamp the battery pack.

As shown in FIGS. 7 and 8 the connector portion also includes a wiring guide 170 which clips onto the top of the guide portion 142 for guiding wiring away from the connector portion and down to the frame of the cycle. The wiring is clamped by plastic gripper portions 182 of the wiring guide 170 to prevent stressing of the wires and contacts and rattling of the wiring, and to guide the wiring down in an arc to the frame as shown in FIG. 3. The clamping action is performed with a bolt and nut through the hole 183 which both secures the connector assembly together, clamps the wires passing through the gripper portions 182 and provides a fixture for the cap 140.

FIG. 8 also shows a connector socket 190 which lies within the top of the battery pack 152. When the connector portion 55 is slid downwards, the guide portion 142 descends down over the connector socket 190 at the top of the battery pack 52. The wiring may be guided by the wiring guide 170 into the guide portion 142 and may terminate with a number of connector pins which are inserted into corresponding holes in the connector socket 190 when the connector portion 55 is slid downwards by rotating the rotating part 144. An O-ring (not illustrated in the drawings) may be provided which sits in a groove below the shoulder 192 of the guide portion 142, above orientation ribs 194 in the lower part of the guide portion. The O-ring seals the connector when mated to prevent water or dirt entering the battery pack. A number of orientation ribs 194 are provided with an asymmetric arrangement (e.g. five ribs spaced around the edge of the guide portion), which engage with corresponding slots 196 in the top of the battery (see FIG. 12), to provide further protection against inserting the battery the wrong way round. The battery charger 56 may similarly have a set of orientation ribs 194 which engage with the slots 196 in the top of the battery, to prevent incorrect connection of the battery to the charger.

FIGS. 9(A) to 9(C) schematically illustrates how the battery pack 52 can be inserted into the holder 54 and the battery pack is clamped and the connection formed using the connector portion 55. As shown in FIG. 9(A), initially the battery pack 52 is inserted into the battery holder 54 at an angle, with the curved indent at the base of the battery pack 52 engaging with the protruding portion 110 of the battery holder 54 so that the battery is aligned centrally relative to the holder. The hemispherical indent allows easy location in centre of base of battery, and the conical section surrounding the indent allows easy location of the indent. The user also twists the battery pack to locate the flat profile of the protruding portion 110 in the slot 132 in the bottom of the battery casing, with the label part 150 pointing outwards in a certain direction to ensure that the battery pack 52 is aligned correctly with the connector portion 55. The user will feel the protruding portion 110 drop into the slot 132 when the battery is correctly aligned.

As shown in FIG. 9(B), the user then tilts the battery pack into the in-use position. At this point the connector portion 55 is in an open position where it lies above the battery pack, and the engaging portions 118 of the battery holder 54 lie at the foot of the corresponding cam portions 152, so that the connector portion provides clearance for the battery pack 52 to be tilted into position. By allowing the battery pack to be tilted into position, rather than sliding the battery in linearly from above, the battery assembly is much more compact since there is no need to provide additional space above the battery for inserting the battery. This means that the battery pack can be fitted to smaller bike frames.

As shown in FIG. 9(C), the user then grips the grip portion 146 of the connector portion 55, slides the connector portion 55 down towards the battery, and rotates the rotating part 144 relative to the battery holder 54 and guide portion 118 (as shown in FIG. 11, some examples may not require sliding the connector portion 55 down before rotating). The engaging portions 118 travel in the direction of the grooves 160 of the guide portion 142 to keep the connector portion 55 in the correct orientation so that the connector portion 55 slides in a linear direction towards the battery. As the user rotates the rotating part 144, the engaging portions 118 of the holder 54 slide along the cam portions 152 to press the connector portion 55 downwards and clamp the battery pack 52 against the protruding portion 110 at the base of the battery holder 54. This secures the battery pack 52 to prevent it falling out or rattling while the cycle is in motion.

Hence, this design of the connector portion 55 and battery holder 54 provides a compact battery assembly which can fit to a range of sizes of cycle frames, and which is very simple to operate for the user, and can securely clamp the battery in position at the same time as making the electrical connections. This is not possible with existing battery assemblies for cycles. A single twist by the user is enough to both complete the electrical connection with the battery and clamp the battery into the holder.

FIGS. 10 and 11 show two examples of the rotating part 144 of the connector portion 55. FIG. 10 shows the same rotating part 144 used in FIGS. 6-9, where the cam portion 152 has a profile such that initially the cam portion rises vertically away from the grip part 146 of the rotating part 144, and then curves away to the side to allow the engaging part 118 to slide over it as the user rotates the rotating part. In contrast, in FIG. 11, the cam portion 152 starts curving away to the side from the foot of the well, so that rotation of the rotating part 144 causes the engaging portion 118 to slide up the cam portion 152 without any need to first slide the connector portion 55 downwards before rotating the rotating part 144.

FIG. 12 shows the top cap 200 of the battery pack 52 in more detail. The top cap includes a label portion 150 which may be used to ensure the correct orientation of the battery. The label portion 150 may include one or more LEDs (light emitting diode) 202 for signalling information to the user, such as whether the amount of remaining charge in the battery is low. For example, a cluster of LEDs of different colours may be provided. In other examples, the LEDs 202 may be located on a different part of the battery pack 52. The top cap also includes a locking recess 204 for receiving a protruding part of the locking member 100 (see FIGS. 18 and 19 discussed below). FIG. 13 shows a side view of the top cap 200, which shows that the locking recess 204 has barrier portions 206 which trap the protruding part of the locking member 100 in the recess so that it cannot slide out sideways unless the protruding part of the locking member is pushed downwards, which cannot occur unless the locking member is unlocked.

The top cap 200 of the battery pack is die cast from aluminium or another metal or alloy, so that it acts as a heat sink portion for dissipating heat from within the battery casing. The cap 200 has a number of heat radiating fins 208 which extend outwards from the centre of the cap 200, providing increased surface area to improve heat dissipation. Forming the top cap as a heat sink is useful to prevent overheating of a control unit (which may comprise a motor drive) 60 (e.g.

microcontroller on a printed circuit board) located inside the casing of the battery pack 52. A number of bolts 210 may be provided within the battery pack to hold the battery pack together. As shown in FIG. 5, the foot of each bolt may lock to the bottom of the casing. Each bolt then passes through the entire length of the battery pack 52, including through the printed circuit board forming the control unit 60, and then couples to the metal heat sink at the top cap 200 of the battery pack 52. By connecting the bolts to the heat sink, the bolts help to conduct heat through the battery pack into the heat sink to improve heat dissipation.

Alternatively, a threaded bar may pass through the battery pack, and each part may be bolted on to the bar with nuts. Some "studding" may be screwed into the cap through the PCB 60, and then a spacer and a nut behind the studding may secure the PCB 60 in the cap, and the bar then goes through the battery pack and is secured with another washer and nut on the other side of the battery pack. Finally, the bottle bottom goes on and is secured with the final nuts on the bottom of the bottle.

The control unit 60 may detect how much charge is remaining in the battery, e.g. by detecting whether the battery voltage drops below a threshold or by coulomb counting. If the voltage is lower than a certain amount, then the control unit 60 may control the LEDs 202 to be illuminated in a certain colour to inform the user how much charge is remaining. For example, a red LED may be illuminated if the amount of charge is low, and a green LED be illuminated otherwise, or another scheme may be used to indicate the amount of charge. The control unit 60 may be triggered to display the amount of remaining charge by the user shaking the battery pack 52 back and forth. The control unit 60 may detect a signature pattern of motion (e.g. a set sequence) and detect the remaining charge when the pattern is detected.

Also, the control unit 60 may control an amount of current supplied to the motor based on the detected battery voltage. For example, there may a minimum safe voltage at which the battery can operate to prevent damage. If the voltage drops below this threshold, then the battery will shut off and no assistance may be provided. However, sometimes when activating the electrical assistance from the motor, the level of current drawn from the battery can cause the voltage to drop below the battery protection threshold even though there is still plenty of usable energy stored in the battery. Usually the higher the current drawn, the more the battery voltage drops. Since the battery voltage will also gradually reduce as the battery charge level reduces, when the remaining battery charge gets to a certain point the higher current levels used for assistance can cause a voltage drop that exceeds the threshold. This ordinarily means that the assistance will need to stop immediately to protect the battery even though there could be enough useful energy left in the battery to provide assistance for a significant time at lower current levels. To prevent the assistance cutting out in this situation, the control unit 60 may gradually taper down the maximum current drawn from the battery as the battery charge decreases. The control unit 60 may set a tapering voltage threshold which is higher than the minimum safe voltage, and when the battery voltage reaches this threshold, the control unit 60 may reduce a maximum current that can be drawn from the battery. With less current being drawn, the voltage will then rise again, and when it reaches the tapering threshold once more than the current can be reduced further. This can be repeated a number of times to extract the last remaining charge from the battery without activation of the motor assistance causing an IR voltage drop below the minimum safe voltage. In some embodiments, some operating parameters of the control unit 60 may be adjusted by the user, by connecting the battery pack to an external device such as a personal computer. For example, the current or current limit provided in each of a number of user modes may be selected by the user.

As shown in FIG. 14, inside the casing may be arranged a number of layers 220 of battery cells 222. FIG. 14 shows two layers of cells, but it will be appreciated that other examples may include a single layer or three or more layers 220. Each layer 220 comprises a number of cells 222 held between two cell holders 230 which grip the ends of the battery cells 222. While FIG. 14 shows two cell holders 230 being placed back to back between adjacent layers 220, in other examples a single cell holder 230 could grip both the bottom end of one layer of cells and the top end of the other layer of cells. The battery cells 222 may for example be lithium cells or nickel metal hydride cells.

FIG. 15 shows an example of the cell holder 230 in more detail. As shown in FIG. 15, the cell holder 230, which may be moulded from plastic, includes a number of protrusions 240 which are positioned in the gaps between adjacent cells 222, and which have wing portions 242 extending from the protrusions 244 for gripping the side of cells. The wing portions 242 are formed by a moulding tool which extends up during manufacturing to form the cell portion through holes 244 located below each wing portion to allow for the passage of the moulding tool. Without these holes 244, the wing portions would still be connected to the base of the cell holder and so could not flex. The wing portions 242 of protrusions 240 at the edge of the cell holder do not require moulding holes 244 because the moulding tool can reach these wing portions 242 because the base does not extend to the edge of the cell holder 230 below the outer wing portions 242. By providing flexible wings to grip the edges of the battery cells, a stronger grip can be achieved. Slot-shaped holes 246 are also formed in the base of the cell holder 230 for receiving electrical contacts, such as rectangular strips of nickel. The cells are placed in the approximately circular gaps between the wing portions of neighbouring protrusions 240. By holding the cells only at parts of the circumference of the cell using the wing portions 244, the cells 222 can be packed closer together since there is no need to provide a solid layer of plastic around each cell, which would take up additional space. This allows the sides of adjacent cells 222 to be placed closer to each other and allows a circular battery pack to be produced where the cell holder 230 does not add anything to the overall diameter of the finished battery pack, which makes the overall battery pack much more compact. Also the arrangement of wing portions 242 extending from protrusions 244 allows much greater flexibility in the cell sizes the cell holders 230 are able to accommodate, thereby meaning one cell holder 230 is suitable for a wider range of cell diameters than is the case with existing types of cell holder. In this example, the cell holder 230 holds 15 cells: an inner ring of 5 cells and an outer ring of 10 cells. However, other layouts of cells could also be provided. The example of FIGS. 14 and 15 can be used for all types of cylindrical cells but it is particularly beneficial for cells that do not require a minimum gap between adjacent cells, such as nickel metal hydride cells, but could also be used for other cell types with a similar shape. Whilst for example cylindrical lithium ion cells require a gap between adjacent cells of typically 1 mm, the arrangement in FIGS. 14 and 15 avoids the extra spacing which results from the plastic thickness of traditional cell holders and allows for a smaller battery case because the cell holder 230 does not add to the overall diameter of the pack. This also means that a closer contact between the cells and the outer case can be achieved which can be beneficial for heat transfer.

FIGS. 16 and 17 show another example of cell holders designed for holding 10 lithium ion cells 222 which allows the same diameter of pack as the 15 cell example in FIGS. 14 and 15 whilst incorporating a gap between cells of approximately 1 mm when using standard 18 mm diameter cells. In this example, a ring of 10 cells is held around the outside of the cell holder 230, with a space in the middle. Again, the cell holder 230 has protrusions 240 with wing portions 242 for gripping parts of the edges of the cells. Unlike in FIG. 15, there is no need for the moulding holes 244 because the wing portions 242 are all near the edge of the cell holder 230 or next to the central hole, so there is space for moulding tool to mould the wing portions. It has been found that by arranging the lithium cells in the way shown in FIGS. 16 and 17, the overall size of the cell holder is roughly the same as for the nickel metal hydride embodiment of FIG. 15 and so the same battery casing can be used for both. While FIG. 17 shows an example where there are 10 protrusions around the central hole, each with one wing portion 242, in other examples the number of protrusions could be reduced to 5 with each protrusion having two wing portions 242 extending in opposite directions from the protrusion 240 to grip two adjacent cells.

In both examples of the cell holder 230, it has been found that by gripping the cell at the at least three points around the circumference around the cell, a solid fit can be achieved which prevents relative movement of the cells. Nevertheless, as the wing portions do not extend around the entire circumference of the cell, less plastic is required and the overall area of the cell holder is more compact because there is no bounding layer of plastic around each cell.

FIGS. 18 and 19 show the locking member 100 in more detail (the padlock 102 has been omitted from FIG. 18 to provide a better view of the locking member 100, but in use would be inserted into the hole of the locking member to secure the locking member). As shown in FIG. 18 the locking member 100 nestles against the indent 148 in the rotating part of the connector portion 55 (the indent 148 is shown in FIG. 6) so that when the locking member is fitted then the rotating part cannot be rotated and so the connector portion cannot be removed from the battery pack. Hence the battery pack will remain clamped into the holder. Also, a protruding part of the locking member 100 fits into the locking recess 204 of the battery pack to secure the locking member to the battery pack. Due to the barrier portions 206 in the locking recess, the locking member 100 cannot be slid out sideways.

FIG. 19 shows the locking member 100 both when assembled (part (a) of FIG. 19) and in an exploded view (part (b)). The locking member 100 includes a first portion (or outer sleeve) 300 and a second portion (or inner sliding rod 302) which are moveable relative to each other and each include a hole 304 for receiving the lock 102. A pin 306 passing through a slot 307 in the second portion 302 of the locking member and fits into holes 308 in the outside of the outer sleeve 300 to fix the two portions 300, 302 together. A spring 310 is provided between the second portion 302 and the pin 306. The lower portion of the second portion 302 comprises a protruding part 312 with a shaped head 314 which engages with the locking recess 204 so that the head cannot be shifted out sideways from the locking recess 204 once the locking member is locked.

In general the spring biases the inner portion 302 upwards relative to the pin 306 connected to the outer sleeve 300, so that the head 314 of the protruding portion 312 is drawn upwards so that it will remain behind the barrier parts 206 of the locking recess 204 to prevent lateral movement. The user can only remove the locking member from the battery pack by pushing down the inner portion 302 relative to the outer sleeve to disengage the head 314 of the protruding portion 312 from the locking recess and then slide the locking member outwards. As the user pushes the inner portion 302 downwards relative to the outer portion 300, the pin 306 moves up in the slot, compressing the spring 310. However, this requires the holes 304 of the inner portion 302 and outer portion 300 to be brought out of alignment with each other. When a lock (e.g. padlock 102, cable or chain) is passed through the holes 304 in the inner and outer portions, then the second portion 302 cannot be moved downwards and so the locking member cannot be disengaged from the locking recess 204. Therefore, the locking member 100 securely prevents removal of the battery pack from the holder or from an external object to which the locking member is locked.

In use, the user presses and holds the button at the top of the locking member 100, slides the locking member 100 into the recess 204 until it clicks when the protrusion 312 is pushed up into the recess, and then locks with a lock 102 (e.g. padlock which can be locked around a cable or D lock). The round locking member 100 sits in a vertical groove 148 in the knurled rotating part of the connector so it cannot be turned without removing the lock.

FIGS. 20 to 22 show another example of a locking member 100 and corresponding end cap for the battery pack. As shown in FIG. 20, the end cap of the battery pack 52 may be provided with a circular hole 330 with a lip 332 and an undercut below the lip 332. FIG. 21 shows an exploded view of the locking member 100, which comprises an outer portion 340 and inner portion 341, and a spring 342 for biasing the inner portion upwards relative to the outer portion 340. As in the previous example, the outer and inner portions 340, 341 each have a hole 343 for receiving a padlock or cable. The outer portion 340 has a protruding portion 344 which is narrower than the rest of the outer portion 340 and fits into the circular hole 330 in the battery pack 52. The inner portion 341 of the locking member 100 has a waist portion 345 which narrows and then gets wider again towards the foot 348 of the inner portion 341. Four balls 346 sit between the waist portion 345 of the inner portion 341 and circular windows 347 in the outer portion 340.

To use the locking member 100, the user pushes down the top of the inner portion 341 to bring the holes 343 in the inner and outer portions out of alignment. When the inner portion 341 is pushed down, the windows 347 holding the balls 346 align with the narrowest part of the waist portion 345 of the inner portion 341, so that when the locking member 100 is inserted into the circular hole 330 in the battery pack 52, the balls 346 can drop into the waist portion 345 so that they can pass the lip 332 of the circular hole 330. The user then releases the top of the inner portion 341 so that the spring 342 biases the inner portion 341 upwards relative to the outer portion 340. At this point, the windows 347 in the outer portion 340 line up with the foot 348 of the inner portion 341 which is wider than the waist portion 345, so that the balls 346 are pushed out of the windows 347 into the undercut portion of the hole 330 in the battery pack. Also, the holes 343 in the outer and inner portions 340, 341 are now aligned with each other, as shown in FIG. 22. The user can now pass a padlock or cable through the holes 343 to secure the locking member 100. Once the padlock or cable has been inserted, the holes 343 can no longer be brought out of alignment, and the locking member 100 cannot be removed from the battery pack 52 because the balls 346 cannot pass the lip 332 of the hole 330 in the battery pack. While this example shows four balls 346 being provided, it will be appreciated that other examples may have more or fewer balls.

FIG. 23 shows a secondary cable guide 350 which may optionally be provided, for routing the cables on either side of a tube or portion of the frame of the cycle, and preventing rattling of the battery holder 54. The secondary cable guide 350 holds the wires against the cycle frame and maintains a desirable arc in the wiring as the connector portion moves to prevent damage to the wiring. The cable guide 350 may be made from a flexible plastic which can flex to accommodate different bicycle frame widths in this position on the bicycle. In some cycles, the fixings for attaching water bottles or other objects protrude out a little (e.g. 1 mm) from the frame due to the outer flange of rivnuts or similar used for these fixing points, and so if the battery holder 54 is attached to these, there may be a gap between the battery holder 54 and the frame at the end of the battery holder 54 nearest to the connector portion. This may cause the battery holder 54 to rattle against the frame when the cycle is in use and the battery pack is clamped in the battery holder. To prevent this, the secondary cable guide may run under the battery holder 54 to fill the gap between the frame and the battery holder 54.

The cable guide 350 has flexible arms 351 which can be pushed apart when fitting the cable guide 350 to the frame of the cycle, and then spring back together again to grip the frame. The battery holder 54 clips into part 352 of the cable guide 350 and is held by gripping portions 354, and a protrusion 356 on the cable guide 350 engages with one of the fixing holes 114 of the battery holder 54. Cable grips 358 hold the wiring in position. In some examples, the wiring may already be held by the cable grips 358 when the cable guide 350 is fitted to the frame. In one example, three cables may extend from the connector portion, for connecting to the motor 58, user input 76 and gear tooth sensor 65. As shown in FIG. 24, the motor cable 360 is held in the outer part of the double cable grip 358-1, and the pedal sensor cable 362 runs in exactly the same curve as the motor cable to the connector behind it (through the inner part of grip 358-1), then loops back on itself and through cable grip 358-2 and back down along the side of the cage 54. FIG. 25 shows the cable routing on the other side of the frame to FIG. 24, with the user input cable 364 running through cable grip 358-3 on the other side of the frame. This provides a neat arrangement for the wiring and does not require the person fitting to the cycle to understand how these cables should be routed. However, it will be appreciated that other examples may run the cables in a different manner.

FIG. 26 shows a second example of a battery assembly 51 according to the present technique. Again, the battery assembly comprises a battery pack 52, cage 54 and connector portion 55 as in the first example discussed above. Components of the second example of the battery assembly 51 are indicated with the same reference numerals as the corresponding components of the first example, and, other than the differences explained below, function in the same way as the first example.

As shown in FIG. 26, the second example has a different locking mechanism for preventing removal of the battery pack 52 from the cage 54, compared to the first example. FIG. 27 shows the components which contribute to the locking mechanism, including the cage 54, the rotating part 144 of the connector portion 55, a hoop portion 400, and a locking brace 402. The locking member 100 of the first example is not provided in the second example.

The cage 54 is similar to the cage 54 of the first example, except that it has an additional hook 410 extending from the bar comprising the fixing holes 114, and a slot 412 in the base of the cage in the part extending towards the protruding portion 110.

The rotating part 144 of the connector portion 55 is similar to that of the first example, except that instead of the indent 148 there is a slot 420 in one side of the finger grip portion of the rotating part 144.

The hoop portion 400 comprises a bar curved into a ring with an inner diameter dimensioned to fit around the battery pack 52. The hoop portion 400 may be made of metal. At each end of the bar is a lug 430 with a hole 432 in it for passing a padlock through both lugs 430 when the ends of the bar are brought together. At the centre of the bar (in the portion which, when placed around the battery pack, is at the opposite side of the ring from the lugs 430) is a notch 434 for receiving the hook 410 of the cage 54.

The locking brace 402 comprises an approximately C-shaped metal bar with horizontally-extending upper and lower prongs 440, 442 linked by a vertically extending crossbar 444 (where horizontal and vertical are respectively defined as directions perpendicular and parallel to the axis of the battery pack when in use). The lower prong 442 ends in a T-shaped protrusion 446 for engaging with the slot 412 in the cage 54, where the top of the T is perpendicular to the lower prong 442 and a curved portion 452 links the top of the T to the lower prong 442. The width of the curved portion 452 is narrower than the width of the slot 412 in the cage 54. The upper prong 440 ends in a protrusion 448 for engaging with the slot 420 in the rotating part 144. The locking brace 402 also has a slot 450 towards the top of the crossbar 444 for receiving the lugs 430 of the hoop portion 400.

FIG. 28A shows the locking mechanism when in use, with the battery pack 52 and the parts of the connector portion 55 other than the rotating part 144 hidden to show the interaction between the locking components more clearly. The hoop portion 400 is placed around the battery pack 52 before clamping the battery pack 52 into the cage 54 using the connector portion 55 in a similar way to the first example. The hoop portion 400 can then be slid up so that the hook 410 of the cage 54 slots into the notch 434 in the hoop portion 400. The locking brace 402 is rotated to align the T-shaped protrusion 446 with the slot 412 in the cage 54, and then the T-shaped protrusion 446 is inserted through the slot, before rotating the locking brace 402 back round so that the slot 450 is aligned with the lugs 430 of the hoop portion 400. At this point, there is freedom to tilt the locking brace 402 back or forward to feed the slot 450 over the lugs 430 and to insert the protrusion 448 into the slot 420 in the rotating part 144, because the curved portion 452 is narrower than the slot 412 in the cage 54 and so can move up and down through the slot 412 as the top end of the locking brace 402 is moved away from or towards the battery pack. Having inserted the protrusion 448 of the upper prong 440 of the locking brace 402 into the slot 420 in the rotating part 144 so that the lugs 430 of the hoop portion 400 protrude through the slot 450 in the locking brace 402, a padlock 102 can then be inserted through the holes 432 in the lugs 430 of the hoop portion 400 and locked to prevent removal of the battery pack 52.

Once the battery pack 52 is locked, the battery pack cannot be unclamped from the cage because the protrusion 448 of the locking brace 402 prevents rotation of the rotating part 144 of the connector portion. The battery pack cannot be tilted sideways or slid out towards the bottom of the cage, because the cage 54, hoop portion 400 and locking brace 402 prevent this and the T shaped protrusion 446 in the locking brace 402 and slot 412 in the cage 54 prevent removal of the locking brace 402 until the padlock 102 has been removed.

In the example described above, the hoop portion 400 may be placed around the battery pack 52 simply by dropping it over the bottle before the bottle is swung into place and secured using the clamping mechanism, but in an alternative embodiment the hoop may include a hinge portion so that the ends of the hoop can be separated and the hoop portion 400 can be fed round the battery pack 52 when the battery pack 52 is already in place within the cage 54.

FIG. 28B shows an alternative design for the cage 54. As shown in FIG. 28B, the slot 412 at the base of the cage 54 may include a round hole 413 so that the T-shaped protrusion 446 of the locking brace 402 can swing round easily when fitting the locking brace, before being levered vertically into place at which point the narrower portion 452 of the locking brace 402 sits in the narrower part of the slot 412 away from the hole 413. With this design, the width of the narrower part 452 of the locking brace 402 can be made only slightly narrower than the slot 412 so that the locking brace cannot easily be rotated round the bottle once in place, to further improve security, while the hole 413 allows the locking brace 402 to swing round when fitting or removing it.

By using the locking mechanism shown in FIGS. 26 to 28B, the battery pack 52 can be secured without requiring a locking member to engage with the die cast top cap 200 of the battery pack 52. This means that, as shown in FIG. 29, the top cap 200 can be formed without the locking recess 204 shown in FIG. 12, which simplifies the machining and tooling for casting the top cap 200 and hence reduces the cost of manufacturing the top cap 200. Also, the locking mechanism provides a highly visible theft deterrent.

Also, in the second example shown in FIG. 29, the rim of the top cap 200 does not include the slots 196 shown in the example of FIG. 12, for receiving the orientation ribs 194 of the guide portion. Instead, as shown in FIGS. 30A and 31, such orientation slots can be included in the connector plug 190 which sits inside the top cap 200 of the battery pack, to prevent incorrect orientation of the battery pack. Again, by simplifying the design of the die cast top cap 200, the top cap 200 is cheaper to manufacture.

Otherwise, the top cap 200 is similar to the example shown in FIG. 12, with heat radiating fins 208 for heat dissipation and a label 150 and charge indicating LED 202 as discussed above.

FIG. 30A shows an exploded view of the connector portion 55 in the second example, which is similar to that of FIG. 8, although in FIG. 30A the top cap 200 of the battery pack is also shown. The wiring protecting cap 140 and wiring guide 170 are the same as in FIG. 8. The rotating part 144 is the same as in FIG. 8, 10 or 11 except that it includes the locking slot 420 shown in FIG. 27 (not visible in FIG. 30A).

The guide portion 142 of FIGS. 30A, 30B and 31 is similar to that of FIG. 8, except that instead of indented grooves 160 with ball bearings 162, the guide portion 142 has three flat portions 480 for engaging with the respective lugs 118 of the cage 54. Also, as shown in FIG. 27, the lugs 118 of the cage 54 do not include holes 120 in this example. FIG. 30B shows an end view of the battery assembly with the end cap 140 and cable guide 170 hidden. As shown in FIG. 30B, the three flat portions 480 of the guide portion 142 are parallel with the flat surfaces of the lugs 118 of the cage, and are prevented from twisting when the guide portion slides up and down as the connector portion 55 is fastened or unfastened, because the three flat portions 480 are guided between the matching flat sides of the lugs 118 of the cage 54. Therefore, the grooves 160 in the guide portion 142 and the ball bearings 162 are unnecessary and can be omitted to make manufacturing cheaper. This example allows less movement than the previous example because the guided portion is guided between the three flat planes of the lugs 118 instead three points of the balls 162. The result can be easier for the user to connect the plug quickly and easily.

As shown in FIGS. 30A and 31, the guide portion 142 has orientation ribs 194, and the connector plug 190 includes corresponding orientation slots 490 for receiving the orientation ribs 194. The asymmetric arrangement of ribs 194 and slots 490 prevents the battery pack 52 being inserted in the wrong orientation.

As shown in FIG. 31, unlike in the first example, the five orientation ribs 194 and slots 490 are not distributed evenly around the circumference of the guide portion 142 and connector plug 190. Instead, they are at irregular intervals. The five orientation ribs 194 are arranged with a single wider rib 194-0 and two pairs of narrower ribs 194-1, 194-2, where the spacing between the two ribs within the same pair 194-1 or 194-2 is smaller than the spacing between different pairs of ribs 194-1, 194-2 or between the single rib 194-0 and either of the pairs 194-1, 194-2. For each of the pairs of ribs 194-1, 194-2, the angle between the point half way between that pair of ribs and the wider rib 194-0 is 120°. Also, the spacing between one pair of ribs 194-1 is different to the spacing between the other pair of ribs 194-2. This arrangement not only prevents incorrect connection of the connector portion 55 to the battery pack 52, and also reduces the chance of the connector catching where one of the ribs 194 drops into the wrong slot 490 as the connector is spun round over the neck of the battery pack, such as when connecting to a charger off the bike. It is not possible for any of the ribs 194 to drop into the wrong slot 490, because the wide rib 194-0 is too big to fit in any other hole, and the space between the other two pairs 194-1, 194-2 is different so that it is not possible for the pair 194-1 to drop into the slots 490 associated with pair 194-2 or vice versa. Also, the stability of the connector portion is improved because there is always support provided in approximately each third of the way round the circumference.

FIG. 32A shows a cross-section through the upper end of the battery pack 52 and connector portion 55 while the battery pack is clamped into the cage 54. For clarity, the cage 54 and the battery cells within the battery pack 52 have been omitted, although it will be appreciated that they would still be provided.

FIG. 32B shows an enlarged cross-section view of one of the fixings in the base of the battery pack 52. As discussed above for the first example, bolts or threaded bars 210 for holding the battery pack 52 together pass through the entire length of the battery pack 52 and are fastened to the top cap 200 and base 502 of the battery pack 52. To prevent water ingress into the battery enclosure through the holes 504 in the base 502 of the battery pack, the holes 504 have a stepped profile so that when the bolts or threaded bars are fastened, the heads 506 of the bolts or sleeve nuts 506 securing the threaded bars do not reach the end of the holes 504 and there is a gap 508 between the underside of the bolt heads or nuts and the end of the holes 504. An O ring can be placed in the gap 508 in each hole 504 to seal the holes and prevent water getting in.

FIG. 32A also shows how the top cap 200 connects to the casing 500 of the battery pack 52. The top cap 200 has an outer collar 510 extending around the circumference of the cap 200, while the casing 500 of the battery pack 52 has a shoulder portion 512 for engaging with the collar 510. Hence, when the cap 200 is fitted to the casing 500, the collar 510 of the cap 200 extends over and around the shoulder 512 of the casing 500. Since the cap 200 will generally be above the casing 500 when the battery pack is in use, the overhang of the cap 200 beyond the rim 512 of the casing 500 prevents water entering the top of the battery pack. The top cap also includes a groove inside the outer collar 510 for accommodating an O-ring 514 for sealing the cap 200 to the casing 500. Alternatively, instead of providing a groove for the O-ring 514, the cap 200 could have a flat surface which presses against the end of the casing 500 to provide a surface seal under compression for sealing the rim of the bottle.

Two further O rings 516, 517 are provided. O ring 516 sits on a flange 519 of the connector plug 190 to seal the neck of the battery pack to prevent water ingress.

O ring 517 fits between the guide portion 142 and the top cap 200 of the battery pack 52. The guide portion 142 has a flange 518 extending around the circumference of the guide portion with a tapered groove below it for holding the O ring 517. O ring 517 prevents water getting inside the connector portion 55 when the battery pack is connected and it is compressed between the flange 518 and the rim 515 at uppermost part of the cap 200, and the tapered shape of the groove prevents the O ring 517 falling off the guide portion when the battery pack 52 is not connected because the O ring 517 is under tension in the groove, an o ring having been chosen with a smaller diameter than the groove before it has been placed in the groove.

FIG. 33 shows the battery cells included in the battery pack 52 of the second example. In this example, the cells are lithium ion cells 222. The cells are arranged in two layers 550, 560. As shown in FIG. 33, each layer has an upper cell holder 530 and lower cell holder 532 with the cells 222 held between the respective cell holders 530, 532. In this context "upper" refers to the end of the cells closest to the top cap 200 and "lower" refers to the end of the cells closest to the base of the battery pack 52.

In the second example, the upper cell holder 530 of each layer 550, 560 has a different design to the lower cell holder 532 (unlike in the first example where identical cell holders are included at each end).

FIG. 34 shows the lower end of the top layer 550 and the upper end of the bottom layer 560. The lower cell holder 532 of the top layer has three prongs 570 which extend downwards from the lower cell holder 532. The upper cell holder 530 of the lower layer 560 has three corresponding recesses 580 for receiving the prongs 570 of the upper layer 550. When the battery pack is assembled, the prongs 570 of the upper layer 550 are inserted into the recesses 580 of the lower layer, and the asymmetric layout of the prongs 570 and recesses 580 prevents the layers being assembled in the wrong orientation. The upper and lower layers 550, 560 have identical designs to simplify manufacturing, so although the lower layer 560 does not need to slot into any cell layer below it, it still has prongs 570 extending from its lower cell holder 532 as shown in FIG. 33. The base of the battery pack 52 may be provided with corresponding recesses for receiving the prongs 570 of the lower layer 560 to align both layers of cells 550, 560 correctly relative to the rest of the battery pack 52.

The prongs 570 of the upper layer house female connector sockets which engage with male connector pins housed inside the recesses 580 of the lower layer 560 when the two layers are coupled together, to form electrical connections between the two layers so that both layers can provide power to the printed circuit board at the top of the battery pack and the other components of the cycle kit.

FIGS. 35 and 36 show the upper cell holder 530 of each layer 550, 560 of cells in more detail. FIG. 35 shows the upper cell holder 530 when viewed from the top (the end closest to the top cap 200) and FIG. 36 shows the upper cell holder 530 when viewed from the bottom. Similarly, FIGS. 37 and 38 show the lower cell holder 532 of each layer when viewed from the top and bottom respectively.

Both cell holders 530, 532 include a number of slot-shaped holes 546 into which connector tags can be welded to form electrical connections between the cells. As in the earlier examples, both cell holders 530, 532 include protrusions 240 with wing portions 242 for gripping the cells in position. Again, through holes 244 are formed in each cell holder 530, 532 to allow the wing portions 242 to be moulded. Ten cells 222 are held in a ring extending around the outside of the cell holders 530, 532. Keeping the cells at the outside is useful because it leaves a space in the middle empty for accommodating a battery protection circuit or battery management system, wiring from these printed circuit boards to the battery tags and the wiring for connector sockets/pins in the prongs 570 and recesses 580 at either ends of the cells, and also because it means that the cells are positioned symmetrically so that the relative positioning of other cells is the same for any given cell, which means that each cell experiences the same operating conditions (e.g. temperature).

To assemble the internal battery pack the upper cell holder 530 is placed on a flat surface then the battery protection circuit (which is rectangular in this example) is pushed into the slot between four clasps 600 in the upper cell holder 530. When the cells and tags are in position, the lower cell holder 532 is slotted on. The battery protection circuitry is larger than the hole in the centre of both cell holders so it cannot fall out. The larger hole 590 in the lower cell holder 532 is where the battery terminals are positioned (positive and negative), and a protruding wall 597 of plastic is provided in this area to keep the two terminals apart.

By arranging the cells in two layers 550, 560, the layers 550, 560 can be packaged and delivered separately if required to reduce the total capacity (in watt-hours) of the delivered cells in a given package below the threshold for having the package treated as dangerous goods, so that the cost of distribution can be reduced. On receiving the two layers 550, 560 of cells, the user can then insert them into the battery casing 500, with the design of the prongs 570 and recesses 580 preventing incorrect insertion and automatically forming the electrical connections between the two layers. The user can then insert the bolts or threaded bars 210 through holes 595 in each of the cell holders and into the top cap 200 of the battery pack 52, fit the base of the battery pack 52 and fasten the bolts 210 (or bars with sleeve nuts) to seal the battery pack. On the other hand, in territories without restrictions on the maximum capacity of transported batteries, or if the total capacity of the battery pack is such that there are no restrictions, then the battery pack could be delivered fully assembled.

FIG. 39 shows a cross-section through the battery pack 52 showing another example of sealing the top cap 200 to the casing 500 of the batter pack 52. As shown in the zoomed in portion of FIG. 39, in this example the rim of the casing 500 has a stepped profile 700 so that when the top cap 200 is placed over the rim of the casing 500, there is a circular groove 702 formed between the top cap 200 and the rim of the casing 500, which extends around the circumference. An O ring 704 is placed in the groove 702 to seal the join between the top cap 200 and the casing 500 to prevent water entering. With this approach, there is no need for the groove in the inside of the top cap for accommodating an O ring 514 as shown in the example of FIG. 32A. This can further simplify casting of the cap 200 and also has the advantage that for a given diameter of the overall battery casing, there is more space available in the battery pack for the printed circuit board (PCB) 60 providing the controller for the cycle kit, which can be a significant issue as space is typically at a premium on the PCB 60. With the approach shown in FIG. 39, the PCB 60 can extend closer to the edges of the casing 500 than in the example of FIG. 32A.

Other than the differences described above, the second example functions in a similar way to the first example.

The following clauses define example embodiments of the present technique:

(1) A battery assembly for fitting a battery pack to a frame of a cycle, the battery assembly comprising: a battery holder for fitting to the frame, wherein the battery holder is configured to hold the battery pack; a connector portion configured to form an electrical connection between wiring for connecting to at least one component of the cycle and the battery pack when the battery pack is held by the battery holder, wherein the connector portion is slidable within part of the battery holder in a linear direction with respect to the battery holder between an open position providing clearance for the battery pack to be inserted into or removed from the battery holder, and a closed position in which the connector portion engages with a mating portion of the battery pack to form the electrical connection with the battery pack; and a clamping mechanism configured to clamp the battery pack into the battery holder when the connector portion is in the closed position.

(2) The battery assembly according to clause (1), wherein the battery holder comprises an engaging portion for engaging with a corresponding portion of the battery pack when the battery pack is inserted into the battery holder in an angled position which is angled relative to an in-use position of the battery pack; and the engaging portion is configured to permit the battery pack to be tilted from the angled position into the in-use position while the corresponding portion of the battery pack is engaged with the engaging portion of the battery holder.

(3) The battery assembly according to clause (2), wherein the engaging portion comprises a protruding portion of the battery holder for engaging with an indented portion of the battery pack.

(4) The battery assembly according to clause (3), wherein the protruding portion comprises a curved end surface for sliding against a curved indent surface of the indented portion of the battery pack when the battery pack is tilted between the angled position and the in-use position.

(5) The battery assembly according to any of clauses (1) to (4), wherein the connector portion is configured to form a plurality of electrical connections between wiring and the battery pack.

(6) The battery assembly according to any of clauses (1) to (5), wherein the connector portion comprises at least part of the clamping mechanism.

(7) The battery assembly according to clause (6), wherein the connector portion is configured to both complete the electrical connection and clamp the battery pack into the battery holder in response to a single user operation.

(8) The battery assembly according to clause (7), wherein the connector portion comprises a rotating part rotatable with respect to the battery holder; and the single user operation comprises the user rotating the rotating part with respect to the battery holder to slide the rotating part towards the battery pack along said linear direction to clamp the battery pack into the battery holder.

(9). The battery assembly according to any of clauses (1) to (8), wherein the connector portion comprises a rotating part rotatable with respect to the battery holder; and the clamping mechanism comprises at least one cam portion provided on one of the rotating part and the battery holder, and at least one engaging portion provided on the other of the rotating part and the battery holder; and wherein the at least one cam portion and the at least one engaging portion are configured such that rotation of the rotating part relative to the battery holder causes the at least one engaging portion to slide with respect to the at least one cam portion to force part of the connector portion towards the battery pack to clamp the battery pack into the battery holder.

(10) The battery assembly according to clause (9), wherein the battery holder comprises the at least one engaging portion and the rotating part comprises the at least one cam portion.

(11) The battery assembly according to any of clauses (9) and (10), wherein the clamping mechanism comprises a plurality of cam portions, and a plurality of engaging portions each for engaging with a respective one of the plurality of cam portions.

(12). The battery assembly according to any of clauses (9) to (11), wherein the clamping mechanism comprises at least three cam portions and at least three engaging portions.

(13) The battery assembly according to any of clauses (9) to (12), wherein the connector portion comprises a guide portion; the rotating part is rotatable relative to the guide portion about an axis of rotation; the guide portion comprises at least one groove aligned in an axial direction parallel to said axis of rotation; and in response to rotation of the rotating part, the at least one engaging portion is configured to slide with respect to the at least one cam portion in a rotational direction and also to follow the at least one groove in the axial direction to force a part of the connector portion towards the battery pack in the axial direction to clamp the battery pack into the battery holder.

(14) The battery assembly according to clause (13), comprising at least one ball disposed between the at least one engaging portion and the at least one groove.

(15) The battery assembly according to any of clauses (1) to (14), wherein the connector portion comprises a wiring guide portion configured to guide the wiring from the connector portion to the frame of the cycle and/or clamp the wiring.

(16) The battery assembly according to any of clauses (1) to (15), comprising a locking member for locking the battery pack to prevent removal of the battery pack.

(17) The battery assembly according to clause (16), wherein the locking member comprises first and second portions which are movable relative to each other, the first and second portions each comprising a hole for receiving a lock when the holes of the first and second portions are aligned with each other; and the battery pack is removable from the locking member when the holes of the first and second portions are not aligned with each other.

(18) The battery assembly according to clause (17), wherein the second portion comprises a protruding portion for engaging with a locking recess of the battery pack to prevent the battery pack being removed from the locking member.

(19) The battery assembly according to clause (18), wherein the protruding portion is removable from the locking recess by moving the second portion relative to the first portion.

(20) The battery assembly according to any of clauses (18) and (19), wherein the protruding portion has a head shaped to prevent the protruding portion being removed from the locking recess while the holes of the first and second portions are aligned with each other.

(21) The battery assembly according to any of clauses (18) to (20), wherein the locking member comprises a spring for biasing the second portion in an opposite direction to a direction of movement of the second portion for removing the protruding portion from the locking recess.

(22) The battery assembly according to any of clauses (16) to (21), wherein the locking member comprises an engaging portion for engaging with a corresponding portion of the connector portion to prevent sliding of the connector portion from the closed position to the open position.

(23) The battery assembly according to any of clauses (1) to (22), wherein the battery holder comprises a plurality of sets of fixing holes for receiving fixing means for fixing the battery holder to the frame of the cycle, each set of fixing holes for fixing the battery holder in a different position relative to the frame.

(24) The battery assembly according to any of clauses (1) to (23), further comprising the battery pack.

(25) The battery assembly according to clause (24), wherein the battery pack comprises an indented portion for receiving a protruding portion of the battery holder.

(26) The battery assembly according to clause (25), wherein the indented portion of the battery pack comprises a curved indent surface for sliding against a curved end surface of the protruding portion of the battery holder.

(27) The battery assembly according to any of clauses (25) and (26), wherein the indented portion comprises a substantially hemispherical indent.

(28) The battery assembly according to any of clauses (25) to (27), wherein the indented portion of the battery pack comprises a slot portion configured to receive the protruding portion of the battery holder to align the battery pack relative to the protruding portion.

(29) The battery assembly according to clause (28), wherein the slot portion is shaped to allow tilting of the battery pack relative to the battery holder while the protruding portion is engaged with the slot portion.

(30) The battery assembly according to any of clauses (24) to (29), comprising a control unit configured to control the at least one component, wherein the control unit is located within a casing of the battery pack.

(31) The battery assembly according to clause (30), wherein the battery pack comprises a heat sink portion configured to dissipate heat from the control unit.

(32) The battery assembly according to clause (31), wherein the heat sink portion comprises a plurality of heat radiating fins.

(33) The battery assembly according to any of clause (31) and (32), wherein the heat sink portion comprises a part of the casing of the battery pack that is made of metal.

(34) The battery assembly according to clause (33), comprising at least one metal bolt or bar passing through at least part of the battery pack for holding the battery pack together; wherein the at least one metal bolt or bar is coupled to the heat sink portion.

(35) The battery assembly according to any of clauses (30) to (34), wherein the control unit has a power saving mode in which the control unit consumes less power than during an active mode.

(36) The battery assembly according to any of clauses (30) to (35), wherein the control unit is configured to detect a predetermined motion of the battery pack; and in response to the control unit detecting the predetermined motion, the control unit is configured to provide an indication of an amount of remaining charge in the battery of the battery pack.

(37) The battery assembly according to any of clauses (30) to (36), wherein the at least one component comprises an electric motor, and the control unit is configured to control the drive of the electric motor by controlling an amount of current supplied to the electric motor; and the control unit is configured to reduce a maximum amount of current supplied to the electric motor each time the battery passes one of plurality of threshold operating points corresponding to different amounts of charge remaining in the battery.

(38) The battery assembly according to clause (37), wherein the control unit is configured to detect that the battery has passed one of the plurality of threshold operating points when a voltage provided by the battery drops below a threshold voltage level.

(39) The battery assembly according to clause (37), wherein the control unit is configured to detect that the battery has passed one of the plurality of threshold operating points when a detected amount of charge remaining in the battery passes below the amount of charge corresponding to the next threshold operating point.

(40) The battery assembly according to any of clauses (24) to (39), wherein the battery pack comprises, disposed within a casing of the battery pack, a plurality of battery cells and at least one cell holder configured to hold ends of at least some of the battery cells; and the at least one cell holder comprises a plurality of protrusions at positions corresponding to gaps between the battery cells, each protrusion having at least one wing portion extending from the protrusion for gripping a part of a corresponding battery cell.

(41) The battery assembly according to clause (40), wherein each battery cell is cylindrical and is gripped by wing portions along only part of the circumference of the battery cell.

(42) The battery assembly according to any of clauses (40) and (41), wherein the wing portions of different protrusions do not contact each other.

(43) The battery assembly according to any of clauses (40) to (42), wherein the at least one cell holder comprises at least one hole provided below a corresponding wing portion for allowing passage of a moulding tool for moulding the wing portion.

(44) The battery assembly according to any of clauses (24) to (43), wherein the battery pack is bottle-shaped or cylindrical and the battery holder comprises a cage for holding the battery pack.

(45) A cycle fitted with a battery assembly according to any of clauses (1) to (44).

(46). An electrically assisted cycle kit for retrofitting to a cycle, the kit comprising the battery assembly according to any of clauses (1) to (44).

(47). A method of fitting a battery assembly to a cycle, the method comprising:
fitting a battery holder to a frame of the cycle; inserting the battery pack into the battery holder; forming an electrical connection between wiring for connecting to at least one component of the cycle and the battery pack by sliding a connector portion within part of the battery holder in a linear direction with respect to the battery holder from an open position providing clearance for the battery pack to be inserted into or removed from the battery holder to a closed position in which the connector portion engages with a mating portion of the battery pack to form the electrical connection with the battery pack; and clamping the battery pack into the battery holder when the connector portion is in the closed position.

(48) A battery pack for a cycle, comprising: a battery casing; a plurality of battery cells disposed within the battery casing; and at least one cell holder for holding ends of at least some of the battery cells; wherein the at least one cell holder comprises a plurality of protrusions at positions corresponding to gaps between the battery cells, each protrusion having at least one wing portion extending from the protrusion for gripping a part of a corresponding battery cell.

(49). A locking member for locking to a battery pack for a cycle; the locking member comprising: first and second portions movable relative to each other, wherein the first and second portions each comprise a hole for receiving a lock when the holes of the first and second portions are aligned with each other; wherein at least one of the first portion and the second portion comprises a protruding portion for engaging with a locking recess of the battery pack to prevent the battery pack being decoupled from the locking member; and the protruding portion is removable from the locking recess of the battery pack when the holes of the first and second portions are not aligned with each other.

(50). The locking member according to clause (49), wherein the first portion comprises the protruding portion, and a plurality of balls are provided between windows in the protruding portion and part of the second portion shaped such that when the holes of the first and second portions are not aligned with each other, the balls can be pushed inwards so that the protruding portion is removable from the locking recess, and when the holes of the first and second portions are aligned with each other, the balls protrude out of the windows and said part of the second portion prevents the balls being pushed inwards so that the protruding portion cannot be removed from the locking recess.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A battery assembly for fitting a battery pack to a frame of a cycle, the battery assembly comprising:
    a battery holder for fitting to the frame, wherein the battery holder is configured to hold the battery pack;
    a connector portion configured to form an electrical connection between wiring for connecting to at least one component of the cycle and the battery pack when the battery pack is held by the battery holder, wherein the connector portion is slidable within part of the battery holder in a linear direction with respect to the battery holder between an open position providing clearance for the battery pack to be inserted into or removed from the battery holder, and a closed position in which the connector portion engages with a mating portion of the battery pack to form the electrical connection with the battery pack; and
    a clamping mechanism configured to clamp the battery pack into the battery holder when the connector portion is in the closed position,
    wherein the connector portion comprises a rotating part rotatable with respect to the battery holder, and
    the clamping mechanism comprises at least one cam portion provided on one of the rotating part and the battery holder; and at least one engaging portion provided on the other of the rotating part and the battery holder,
    wherein the at least one cam portion and the at least one engaging portion are configured such that rotation of the rotating part relative to the battery holder causes the at least one engaging portion to slide with respect to the at least one cam portion to force part of the connector portion towards the battery pack to clamp the battery pack into the battery holder.

2. The battery assembly according to claim 1, wherein the battery holder comprises another engaging portion for engaging with a corresponding portion of the battery pack when the battery pack is inserted into the battery holder in an angled position which is angled relative to an in-use position of the battery pack,
    wherein the another engaging portion is configured to permit the battery pack to be tilted from the angled position into the in-use position while the corresponding portion of the battery pack is engaged with the another engaging portion of the battery holder.

3. The battery assembly according to claim 2, wherein the another engaging portion comprises a protruding portion of the battery holder for engaging with an indented portion of the battery pack.

4. The battery assembly according to claim 3, wherein the protruding portion comprises a curved end surface for sliding against a curved indent surface of the indented portion of the battery pack when the battery pack is tilted between the angled position and the in-use position.

5. The battery assembly according to claim 1, wherein the connector portion comprises at least part of the clamping mechanism, and the connector portion is configured to both complete the electrical connection and clamp the battery pack into the battery holder in response to a single user operation.

6. The battery assembly according to claim 1, wherein the clamping mechanism comprises at least three cam portions and at least three engaging portions.

7. The battery assembly according to claim 1, wherein the connector portion comprises a guide portion, the rotating part is rotatable relative to the guide portion about an axis of rotation,
    wherein the guide portion comprises at least one groove or flattened portion aligned in an axial direction parallel to said axis of rotation; and
    in response to rotation of the rotating part, the at least one engaging portion is configured to slide with respect to the at least one cam portion in a rotational direction and also to follow the at least one groove or flattened portion in the axial direction to force a part of the connector portion towards the battery pack in the axial direction to clamp the battery pack into the battery holder.

8. The battery assembly according to claim 1, further comprising the battery pack,
    wherein the battery pack comprises an indented portion for receiving a protruding portion of the battery holder, wherein the indented portion of the battery pack comprises a curved indent surface for sliding against a curved end surface of the protruding portion of the battery holder.

9. The battery assembly according to claim 8, wherein the indented portion comprises a substantially hemispherical indent.

10. The battery assembly according to claim 8, wherein the indented portion of the battery pack comprises a slot portion configured to receive the protruding portion of the battery holder to align the battery pack relative to the protruding portion.

11. The battery assembly according to claim 1, further comprising the battery pack, wherein the battery pack comprises a control unit configured to control the at least one component is located within a casing of the battery pack,
    wherein the control unit is configured to detect a predetermined motion of the battery pack, and
    in response to the control unit detecting the predetermined motion, the control unit is configured to provide an indication of an amount of remaining charge in a plurality of cells of the battery pack.

12. The battery assembly according to claim 1, further comprising the battery pack, wherein the battery pack comprises a control unit configured to control the at least one component is located within a casing of the battery pack, wherein the at least one component comprises an electric motor, and wherein the control unit is configured to control a drive of the electric motor by controlling an amount of current supplied to the electric motor, and to reduce a maximum amount of current supplied to the electric motor each time the battery pack passes one of plurality of threshold operating points corresponding to different amounts of charge remaining in the battery pack.

13. The battery assembly according to claim 1, further comprising the battery pack, wherein the battery pack comprises, disposed within a casing of the battery pack, a plurality of battery cells and at least one cell holder configured to hold ends of at least two of the plurality of the battery cells, wherein the at least one cell holder comprises a plurality of protrusions at positions corresponding to gaps between the plurality of the battery cells, each protrusion having at least one wing portion extending from the protrusion for gripping a part of a corresponding battery cell.

* * * * *